United States Patent
Ma et al.

(10) Patent No.: US 8,249,024 B2
(45) Date of Patent: Aug. 21, 2012

(54) SOFT HANDOFF IN OFDMA SYSTEM

(75) Inventors: Jianglei Ma, Kanata (CA); Wen Tong, Ottawa (CA); Ming Jia, Ottawa (CA); Peiying Zhu, Kanata (CA); Mo-Han Fong, Ottawa (CA); Hang Zhang, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/221,579

(22) Filed: Aug. 30, 2011

(65) Prior Publication Data

US 2011/0310847 A1     Dec. 22, 2011

Related U.S. Application Data

(62) Division of application No. 11/630,473, filed as application No. PCT/CA2005/000970 on Jun. 22, 2005, now Pat. No. 8,023,466.

(60) Provisional application No. 60/581,356, filed on Jun. 22, 2004.

(51) Int. Cl.
    *H04W 36/18* (2009.01)
(52) U.S. Cl. ......... 370/331; 455/442; 375/267
(58) Field of Classification Search ........ 370/331, 370/480; 375/267, 347; 455/442, 452.1, 455/452.2
    See application file for complete search history.

(56) References Cited

U.S. PATENT DOCUMENTS

| | | | |
|---|---|---|---|
| 6,075,990 A | 6/2000 | Shin | |
| 6,307,840 B1 | 10/2001 | Wheatley, III et al. | |
| 6,882,677 B2 | 4/2005 | Dehner et al. | |
| 7,154,933 B2 | 12/2006 | Agrawal | |
| 2002/0105928 A1 | 8/2002 | Kapoor et al. | |
| 2003/0043928 A1* | 3/2003 | Ling et al. | 375/267 |
| 2004/0136393 A1* | 7/2004 | Riveiro Insua et al. | 370/432 |
| 2005/0141412 A1 | 6/2005 | Sadri et al. | |
| 2007/0242600 A1 | 10/2007 | Li et al. | |

FOREIGN PATENT DOCUMENTS

| | | |
|---|---|---|
| EP | 0872141 A1 | 10/1998 |
| WO | WO0249305 A2 | 6/2002 |
| WO | WO03061180 A1 | 7/2003 |
| WO | WO03081938 A1 | 10/2003 |
| WO | WO2005125250 A1 | 12/2005 |

OTHER PUBLICATIONS

International Search Report mailed on Oct. 21, 2005 for PCT/CA2005/000970, 4 pages.

Notice of Allowance mailed May 17, 2011 for U.S. Appl. No. 11/630,473, 9 pages.

(Continued)

*Primary Examiner* — Phuoc Doan
(74) *Attorney, Agent, or Firm* — Meyertons, Hood, Kivlin, Kowert & Goetzel, P.C.

(57) ABSTRACT

Soft handoff in an OFDMA system is disclosed. If the pilot signal strength for a base station exceeds the defined threshold, the base station is added to an active set list. Subcarriers in a plurality of orthogonal frequency division multiplexing (OFDM) symbols are divided and allocated into subchannels. The OFDM symbols are divided and multiplexed. A soft handoff zone with a first dimension of the subchannels and a second dimension of the divided and multiplexed OFDM symbols is defined. The soft handoff zone has subcarriers with a subchannel definition, for example, an identical permutation.

38 Claims, 16 Drawing Sheets

OTHER PUBLICATIONS

Restriction Requirement mailed Mar. 4, 2011 for U.S. Appl. No. 11/630,473, 5 pages.
Notice of Allowance mailed Jul. 11, 2011 for U.S. Appl. 11/630,473, 2 pages.
Segal, Y. et al., "OFDMA Modification for Mobility," The IEEE 802.16 Working Group on Broadband Wireless Access Standards, May 12, 2003, IEEE C802.16e-03/25r2, 17 pages, http://www.ieee802.org/16/tge/contrib/C80216e-03_25r2.pdf.
Notice of Allowance for U.S. Appl. No. 13/221,601 mailed Feb. 8, 2012, 8 pages.
Non-final Office Action for U.S. Appl. No. 13/221,535 mailed Mar. 5, 2012, 13 pages.

* cited by examiner (a)

(b)

- ● Pilots
- △ Data Carrier (a)

- ● Pilots
- △ Data Carrier (b)

(a)

(b)

SOFT HANDOFF IN OFDMA SYSTEM

CROSS-REFERENCE TO RELATED APPLICATIONS

The present application is a divisional of, and claims priority to, U.S. patent application Ser. No. 11/630,473, filed on Jan. 23, 2008, entitled "SOFT HANDOFF IN OFDMA SYSTEM," which is hereby incorporated herein by reference in its entirety, and which is a National Phase filing of PCT/CA2005/00970, which is hereby incorporated herein by reference in its entirety, and which claims the benefit of the filing date of U.S. Provisional Application No. 60/581,356, filed on Jun. 22, 2004, which is hereby incorporated herein by reference in its entirety.

FIELD OF THE INVENTION

The present invention relates to the delivery of data via a wireless connection and, more particularly, to the accurate delivery of data at high rates via a wireless connection.

BACKGROUND OF THE INVENTION

Recent growth in demand for broadband wireless services enables rapid deployment of innovative, cost-effective, and interoperable multi-vendor broadband wireless access products, providing alternatives to wireline broadband access for applications such as telephony, personal communications systems (PCS) and high definition television (HDTV). At the same time, broadband wireless access has been extended from fixed to mobile subscriber stations, for example at vehicular speed. Though the demand for these services is growing, the channel bandwidth over which the data may be delivered is limited. Therefore, it is desirable to deliver data at high speeds over this limited bandwidth in an efficient, as well as cost effective, manner.

In the ever-continuing effort to increase data rates and capacity of wireless networks, communication technologies evolve. An encouraging solution for the next generation broadband wireless access delivering high speed data over a channel is by using Orthogonal Frequency Division Multiplexing (OFDM). The high-speed data signals are divided into tens or hundreds of lower speed signals that are transmitted in parallel over respective frequencies within a radio frequency (RF) signal that are known as subcarrier frequencies ("subcarriers"). The frequency spectra of the subcarriers may overlap so that the spacing between them is minimized. The subcarriers are also orthogonal to each other so that they are statistically independent and do not create crosstalk or otherwise interfere with each other. When all of the allocated spectrum can be used by all base stations, the channel bandwidth is used much more efficiently than in conventional single carrier transmission schemes such as AM/FM (amplitude or frequency modulation), in which only one signal at a time is sent using only one radio frequency, or frequency division multiplexing (FDM), in which portions of the channel bandwidth are not used so that the subcarrier frequencies are separated and isolated to avoid inter-carrier interference (ICI).

In OFDM, each block of data is converted into parallel form and mapped into each subcarrier as frequency domain symbols. To get time domain signals for transmission, an inverse discrete Fourier transform or its fast version, IFFT, is applied to the symbols. The symbol duration is much longer than the length of the channel impulse response so that inter-symbol interference is avoided by inserting a cyclic prefix or a predefined value for each OFDM symbol. Thus, OFDM is much less susceptible to data loss caused by multipath fading than other known techniques for data transmission. Also, the coding of data onto the OFDM subcarriers takes advantage of frequency diversity to mitigate loss from frequency-selective fading when forward error correction (FEC) is applied.

Another approach to providing more efficient use of the channel bandwidth is to transmit the data using a base station having multiple antennas and then receive the transmitted data using a remote station having multiple receiving antennas, referred to as Multiple Input-Multiple Output (MIMO). The data may be transmitted such there is spatial diversity between the signals transmitted by the respective antennas, thereby increasing the data capacity by increasing the number of antennas. Alternatively, the data is transmitted such that there is temporal diversity between the signals transmitted by the respective antennas, thereby reducing signal fading.

Wireless communication systems divide areas of coverage into cells, each of which is served by a base station. A subscriber station will continuously monitor the signal strengths of the servicing base station for the current cell as well as for adjacent cells. The subscriber station will send the signal strength information to the network. As the subscriber station moves toward the edge of the current cell, the servicing base station will determine that the subscriber station's signal strength is diminishing, while an adjacent base station will determine the signal strength is increasing. The two base stations coordinate with each other through the network, and when the signal strength of the adjacent base station surpasses that of the current base station, control of the communications is switched to the adjacent base station from the current base station. The switching of control from one base station to another is referred to as a handoff.

A hard handoff is a handoff that completely and instantaneously transitions from a first station to a second base station. Hard handoffs have proven problematic and often result in dropped calls. Wireless systems may incorporate a soft handoff, wherein when the subscriber station moves from a first to a second cell, the handoff process happens in multiple steps. First, the subscriber station recognizes the viability of the second base station, and the network allows both the current and adjacent base stations to carry the call. As the subscriber station move closer to the second base station and away from the first base station, the signal strength from the first base station will eventually drop below a useful level. The subscriber station will then inform the network, which will instruct the first base station to drop the call and let the second base station continue servicing the call. Accordingly, a soft handoff is characterized by commencing communications with a new base station before terminating communications with the old base station.

In orthogonal frequency division multiplexing access (OFDMA) systems, multiple users are allowed to transmit simultaneously on the different subcarriers per OFDM symbol. In an OFDMA/TDMA embodiment, for example, the OFDM symbols are allocated by time division multiplexing access (TDMA) method in the time domain, and the subcarriers within an OFDM symbols are divided in frequency domain into subsets of subcarriers. In other embodiment, to average inter-cell interference, different cells may use, for example, different permutations to generate subchannel.

It is therefore desirable to provide soft handoff to broadband wireless access system employing OFDMA. Because different spreading code masking is not available in OFDM transmission, the destructive interferences between base stations transmitting the same signal can cause significant degradation of performance.

It is further desirable to define a soft handoff zone with same permutation wherein the base stations provide RF combining, interference avoidance, soft combining, or selection combination in the handoff area. It is further desirable to use multi-input, multi-output (MIMO) method in a soft handoff of an OFDMA system. This MIMO method may apply to a plurality of base stations, each of the base stations has one, or more than one antennas.

Accordingly, there is a need for an efficient soft handoff technique for OFDMA systems as well as a need to increase data rates and reduce interference at cell borders. It is further desirable to provide soft handoff technique to a MIMO OFDMA system.

SUMMARY OF THE INVENTION

In downlink communications, each subscriber station constantly measures all of the possible pilot signal strengths of transmissions from adjacent base stations, identifies the strongest pilot signals, and compares them against a defined threshold. If the pilot signal strength for a base station exceeds the defined threshold, that base station is added to an active set list. Each subscriber station will notify the base stations of their active set lists. If there is only one base station in the active set list, said base station is singled out to service the subscriber station. If there is more than one base station on the active set list, a soft handoff is enabled between those base stations. The soft handoff condition will continue until only one base station is on the active set list, wherein the lone base station will continue to serve the subscriber station. The soft handoff can be initiated by the subscriber station, which will report the active set list to the base station controller via the servicing base station. The base station controller will alert the base stations on the active set list of the soft handoff. Notably, the base station controller can select a sub-set of the base stations from the active set list to establish the soft hand off. During soft handoff, all base stations on the active set list will facilitate communications with the subscriber station as defined below. Preferably, the base station controller keeps track of all of the active set lists for the respective subscriber stations. The subscriber stations will keep track of their individual set lists.

Accordingly, by providing the set list to the base station controller and the servicing base station, the subscriber station identifies the sole servicing base station or triggers a soft handoff (SHO)mode when multiple base stations appear on the active set list.

In orthogonal frequency division multiplexing access (OFDMA) systems, multiple users transmit simultaneously on the different subcarriers per OFDM symbol. In an OFDMA/TDMA embodiment, the OFDM symbols are allocated by TDMA method in the time domain, and the subcathers within OFDM symbols are divided by OFDMA method in frequency domain into subsets of subcarriers, each subset is termed a subchannel Each subchannel may comprise the subcarriers from a plurality of OFDM symbols. These subchannels are the basic allocation unit. The subchannel may be spread over the entire bandwidth. This scheme achieves improved frequency diversity and channel usage. In OFDMA, a transmit frame may be divided into uplink (UL) and downlink (DL) subframes in time division multiplex (TDD) mode. A zone is defined as a number of OFDMA symbols, in the DL or the UL, that use the same subchannel definition, for example, permutation. A zone may be comprised of contiguous OFDM symbols. The DL subframe or the UL subframe may contain more than one pemmtation zone. A soft handoff zone is defined for use in the handoff area with the same subchannel definition between all active base stations.

Hence, the base stations in the active set can partition the time and frequency resources of the OFDM signal. Accordingly, each base station transmits same signal through same channel resource (or same subchannel). Preferably, an improved reception performance of the subscriber stations is achieved through RF combining, soft combining, or selection combining. The base stations may further provide interference avoidance.

In a multi-input, multi-output system, base stations transmit space-time code (STC) encoded data, and the subscriber stations provide corresponding STC decoding to recover the transmitted data. The STC coding may be either space-time-transmit diversity (STTD), space-frequency-transmit diversity (SFTD) or space multiplexing (SM) coding. STTD coding encodes data into multiple formats and simultaneously transmits the multiple formats with spatial diversity (i.e. from antennas at different locations). SM coding separates data into different groups and separately encodes and simultaneously transmits each group. The subscriber station will separately de-modulate and decode the received data from each base station, and then combine the decoded data from each base station to recover the original data. In accordance with one aspect of the present invention, there is provided a method for facilitating soft handoffs in an orthogonal frequency division multiplexing access (OFDMA) system comprising the steps of: dividing subcarriers in a plurality of orthogonal frequency division multiplexing (OFDM) symbols; allocating said divided subcarriers into subchannels; dividing and multiplexing said plurality of OFDM symbols; defining a soft handoff zone comprising a first dimension of said subchamiels and a second dimension of said divided and multiplexed plurality of OFDM symbols; said soft handoff zone having a first plurality of subcarriers, said first plurality of subcarriers having an identical subchannel definition; and transmitting said first plurality of subcarriers in said soft handoff zone to a station. Preferably, the subchannel definition is a subcarrier permutation. Preferably, the subcarriers are divided in a frequency domain.

In accordance with another aspect of the present invention, there is provided an orthogonal frequency division multiplexing access (OFDMA) system comprising: a base station controller adapted to schedule data for a subscriber station during a soft handoff mode; a plurality of base stations operatively associated with said base station controller, each base station participating in said soft handoff being adapted to receive at least a portion of scheduled data from said base station controller, and to transmit a first plurality of subcarriers to said subscriber station; said first plurality of subcarriers being defined in a soft handoff zone comprising a first dimension of subchannels, said subchannels comprising said first plurality of subcarriers divided in a frequency domain; and a second dimension of divided and multiplexed OFDM symbols comprising said first plurality of subcarriers; said first plurality of subcarriers in said soft handoff zone having an identical subchannel definition.

In accordance with another aspect of the present invention, there is provided a base station in an orthogonal frequency division multiplexing access (OFDMA) system comprising: subchannel definition logic adapted to provide a subchannel definition to a first plurality of subcarriers; dividing and multiplexing encoding logic adapted to provide dividing-multiplexing coding for a plurality of orthogonal frequency division multiplexing (OFDM) symbols, said OFDM symbols comprising said plurality of subcarriers; Inverse Fourier Transform (IFT) logic adapted to provide an IFT on each of said first plurality of subcarriers to generate said plurality of OFDM symbols, said first plurality of subcarriers being defined in a soft handoff zone comprising a first dimension of subchannels, said subchannels comprising said first plurality of subcarriers; and a second dimension of divided and multiplexed plurality of OFDM symbols; said subcarriers in said soft handoff zone having an identical subchannel definition; and transmit circuitry transmitting said first plurality of subcarriers for reception by a subscriber station.

In accordance with another aspect of the present invention, there is provided a subscriber station in an orthogonal frequency division multiplexing access (OFDMA) system comprising: receive circuitry adapted to receive and downconvert a plurality of OFDM signals, said plurality of OFDM symbols comprising a first plurality of subcarriers, said plurality of subcarriers being defined in a soft handoff zone comprising a first dimension of subchannels, said subchannels comprising said first plurality of subcarriers; and a second dimension of divided and multiplexed OFDM symbols; said first plurality of subcarriers in said soft handoff zone having identical subchannel definition; Fourier Transform (FT) logic adapted to provide a FT on each of said first plurality of subcarriers to generate a plurality of division-multiplexing coded signals, and decoder logic adapted to provide division-multiplexing decoding on the plurality of divided-multiplexed coded signals to recover data from a base station.

BRIEF DESCRIPTION OF THE DRAWING FIGURES

The invention and the illustrated embodiments may be better understood, and the numerous objects, advantages, and features of the present invention and illustrated embodiments will become apparent to those skilled in the art by reference to the accompanying drawings. In the drawings, like reference numerals refer to like parts throughout the various views of the non-limiting and non-exhaustive embodiments of the present invention, and wherein:

FIG. 6 (*b*) shows an example of a basic structure of an OFDMA symbol in frequency domain;

FIG. 9 (*b*) shows an example of a tile;

FIG. 10 (*b*) illustrates an OFDMA frame with a soft handoff zone;

Figure 15:
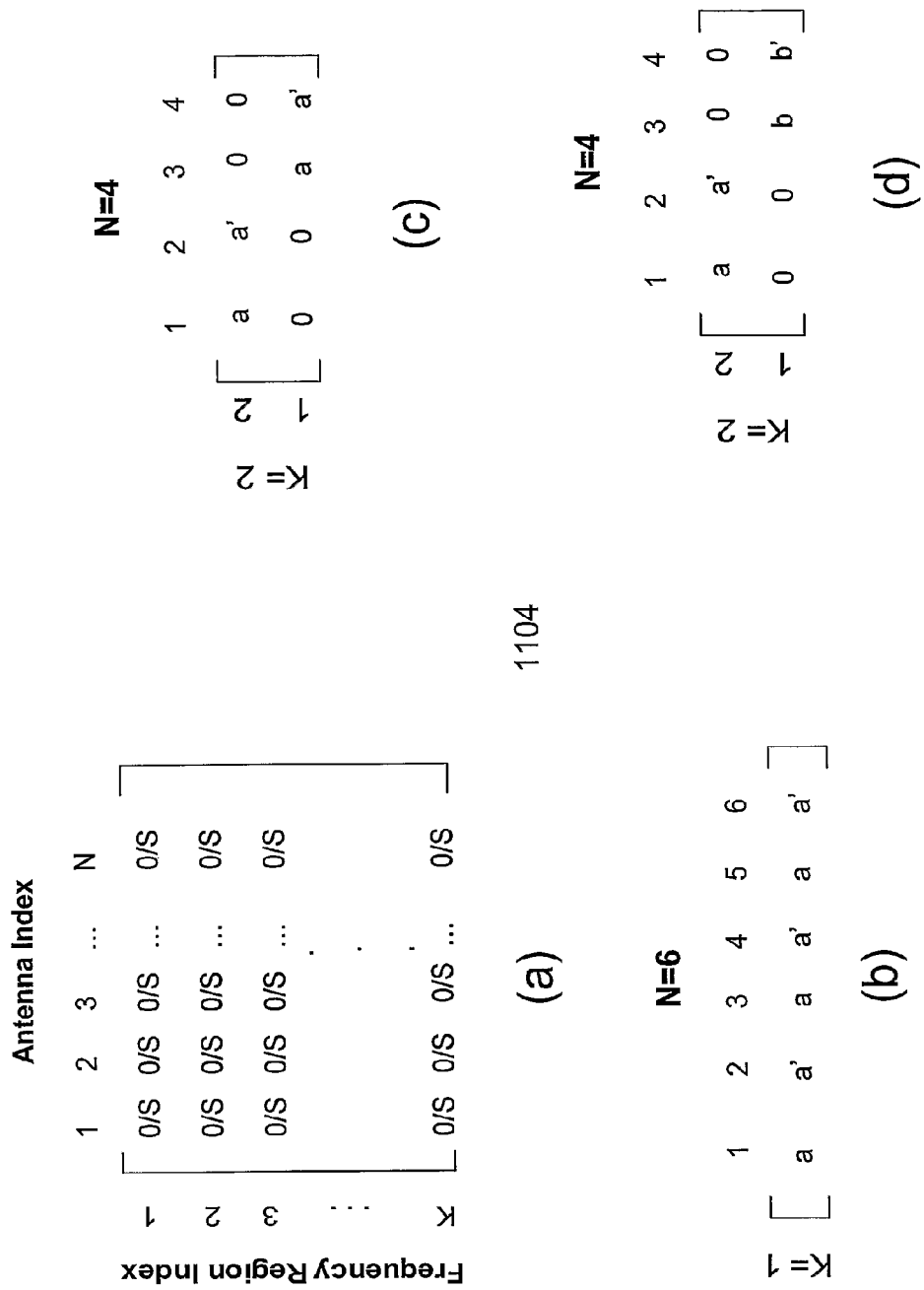
FIG. 15(*a*) illustrates a general expression for macro-diversity MIMO operation.

FIGS. 15 (*b*), (*c*) and (*d*) illustrate examples of expressions of macro-diversity MIMO operation; and FIG. 16 shows examples of allocation of subcarriers in macro-diversity MIMO operation.

DETAILED DESCRIPTION OF THE PREFERRED EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

The term "subscriber station" is intended to include any device which may provide connectivity between subscriber equipment and a base station (BS). A subscriber station may be fixed, or mobile. When the subscriber station is mobile, the speed of its mobile carrier should be apparent to a person skilled in the art, for example, the speed of an automobile, an aircraft or a satellite. The term "base station" is intended to include generalized equipment set providing connectivity, management, and control of the subscriber station (SS). The term "protocol data unit" (PDU) is intended to describe a data unit exchanged between peer entities of the same protocol layer. The term "service data unit" (SDU) is intended to describe a data unit exchanged between two adjacent protocol layers.

Figure 1:
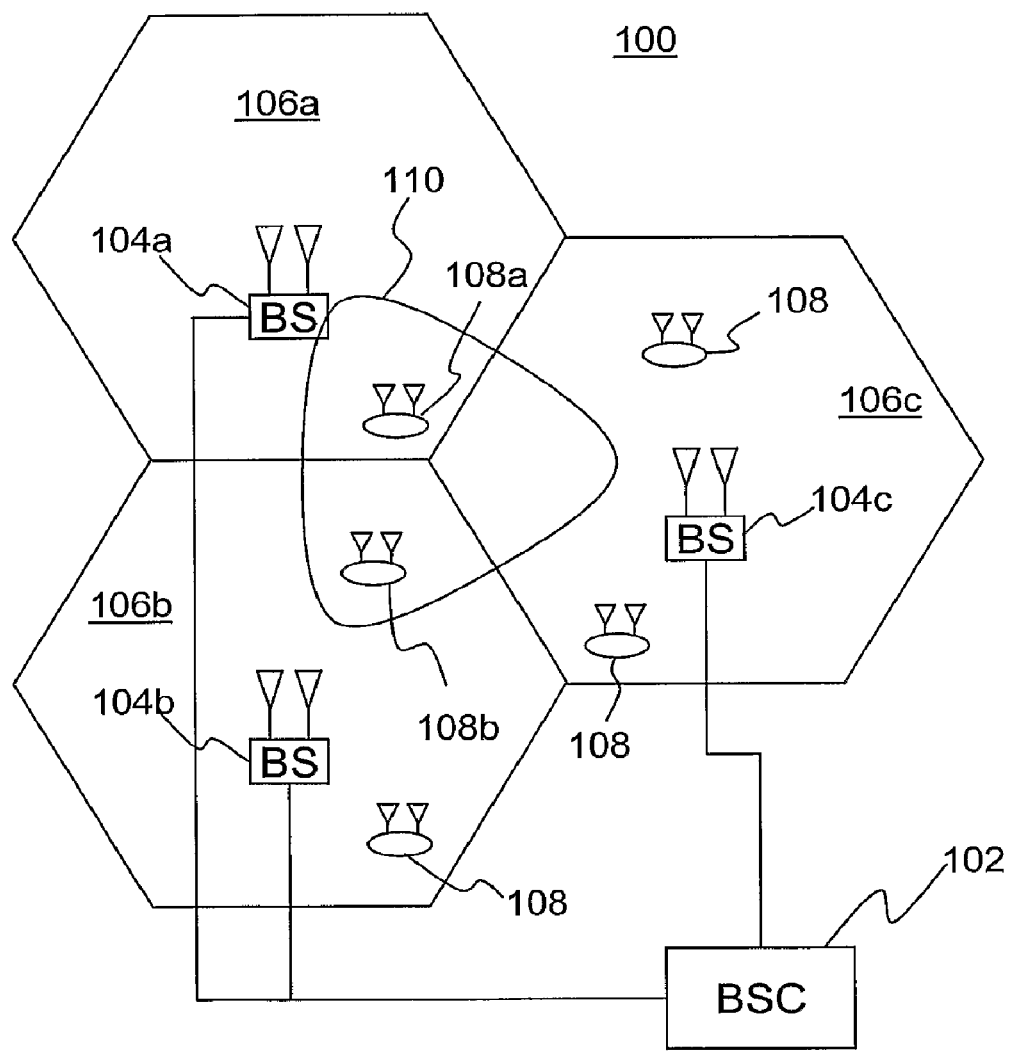
FIG. 1 is a block representation of a cellular communication system.

With reference to FIG. 1, in a wireless communication system 100 a base station controller (BSC) 102 controls base stations (BS) 104 within corresponding cells 106. In general, each base station 104 will facilitate communications with subscriber stations 108, which are within the cell 106 associated with the corresponding base station 104. As a subscriber station 108 moves from a first cell 106*a* to a second cell 106*b*, communications with the subscriber station 108 transition from one base station 104 to another. The term "handoff" is generally used to refer to techniques for switching from one base station 104 to another during a communication session with a subscriber station 106. The base stations 104 cooperate with the base station controller 102 to ensure that handoffs are properly orchestrated, and that data intended for the subscriber station 108 is provided to the appropriate base station 104 currently supporting communications with the subscriber station 108.

Handoffs are generally characterized as either hard or soft. Hard handoffs refer to handoffs where the transition from one base station 104a to another base station 104b is characterized by the first base station 104a stopping communications with the subscriber station 108b at the precise time when the second base station 104b begins communications with the subscriber station 106. Unfortunately, hard handoffs are prone to dropping communications, and have proven to be sufficiently unreliable. Soft handoffs are characterized by multiple base stations 104 simultaneously communicating with a subscriber station 108 during a handoff period. Identical information may be transmitted to the subscriber station 108 from different base stations 104, and the subscriber station 108 attempts to receive signals from both base stations 104a and 104b until the base station 104b to which the subscriber station 108b is transitioning is deemed capable of taking over communications with the subscriber station 108. It should be apparent to a person skilled in the art that more than two base stations can participate in a soft handoff, referring to FIG. 1, for example, all base stations 104a, 104b, and 104c may participate in a soft handoff.

In FIG. 1, a handoff area 110 is illustrated at the junction of three cells 106, wherein a subscriber station 108b is at the edge of any one of the three cells 106 and could potentially be supported by any of the base stations 104a, 104b and 104c within those cells 106a, 106b and 106c. The present invention provides a method and architecture for facilitating soft handoff in an orthogonal frequency division multiplexing access (OFDMA) wireless communication environment. Orthogonal frequency division multiplexing access (OFDMA) allows multiple users, for example subscriber station 108a and 108b, to transmit simultaneously on the different subcarriers per OFDM symbol. In OFDMA/TDMA, subcarriers within OFDM symbols are divided by OFDMA method in frequency domain into subsets of subcarriers, which is termed a subchannel. These subchannels are the basic allocation unit. Each subchannel may comprise the subcarriers from a plurality of OFDM symbols. The subchannel may therefore be spread over the entire bandwidth. Therefore, in the OFDMA/TDMA embodiment, OFDM symbols are shared both in time and in frequency (by subchannel allocation) between different users. As it will be described later, an SHO zone having the same subchannel definition, for example, permutation code could be defined to facilitate the handoff, to provide RF combining, to reduce interference; and to provide selection combining.

Figure 2:
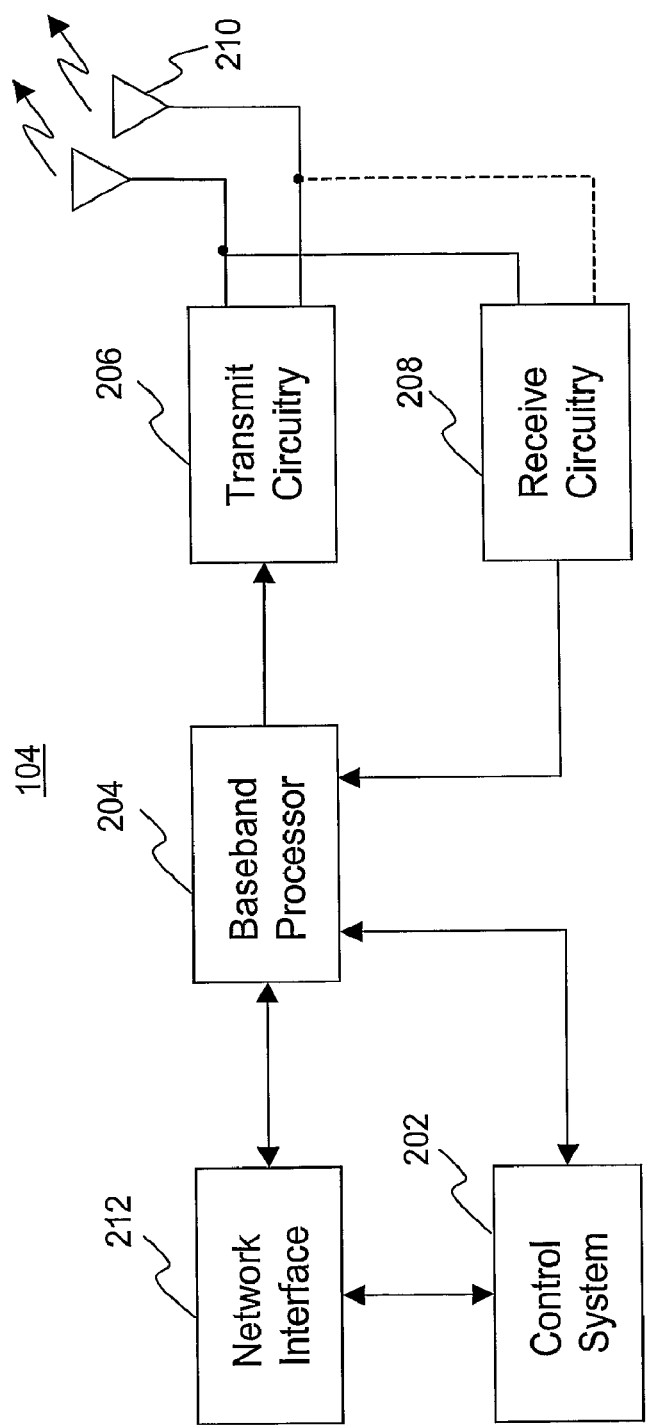
FIG. 2 is a block representation of a base station according to one embodiment of the present invention.

A high level overview of the subscriber stations 108 and base stations 104 of the present invention is provided prior to delving into the structural and functional details of the preferred embodiments. With reference to FIG. 2, a base station 104 configured according to one embodiment of the present invention is illustrated. The base station 104 generally includes a control system 202, a baseband processor 204, transmit circuitry 206, receive circuitry 208, multiple antennas 210, and a network interface 212. The receive circuitry 208 receives radio frequency signals bearing information from one or more remote transmitters provided by subscriber stations 108 (illustrated in FIG. 3). Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 204 processes the digitized received signal to extract the infojination or data bits conveyed in the received signal. This processing typically comprises demodulation, decoding, and error correction operations. As such, the baseband processor 204 is generally implemented in one or more digital signal processors (DSPs). The received infoiuiation is then sent across a wireless network via the network interface 212 or transmitted to another subscriber station 108 serviced by the base station 104. The network interface 212 will typically interact with the base station controller and a circuit-switched network forming a part of a wireless network, which may be coupled to the public switched telephone network (PSTN) or Internet Protocol (IP) network.

On the transmit side, the baseband processor 204 receives digitized data, which may represent voice, data, or control information, from the network interface 212 under the control of control system 202, which encodes the data for transmission. The encoded data is output to the transmit circuitry 206, where it is modulated by a carrier signal having a desired transmit frequency or frequencies. A power amplifier (not shown) will amplify the modulated carrier signal to a level appropriate for transmission, and deliver the modulated carrier signal to the antennas 210 throvigh a matching network (not shown). Modulation and processing details are described in greater detail below.

Figure 3:
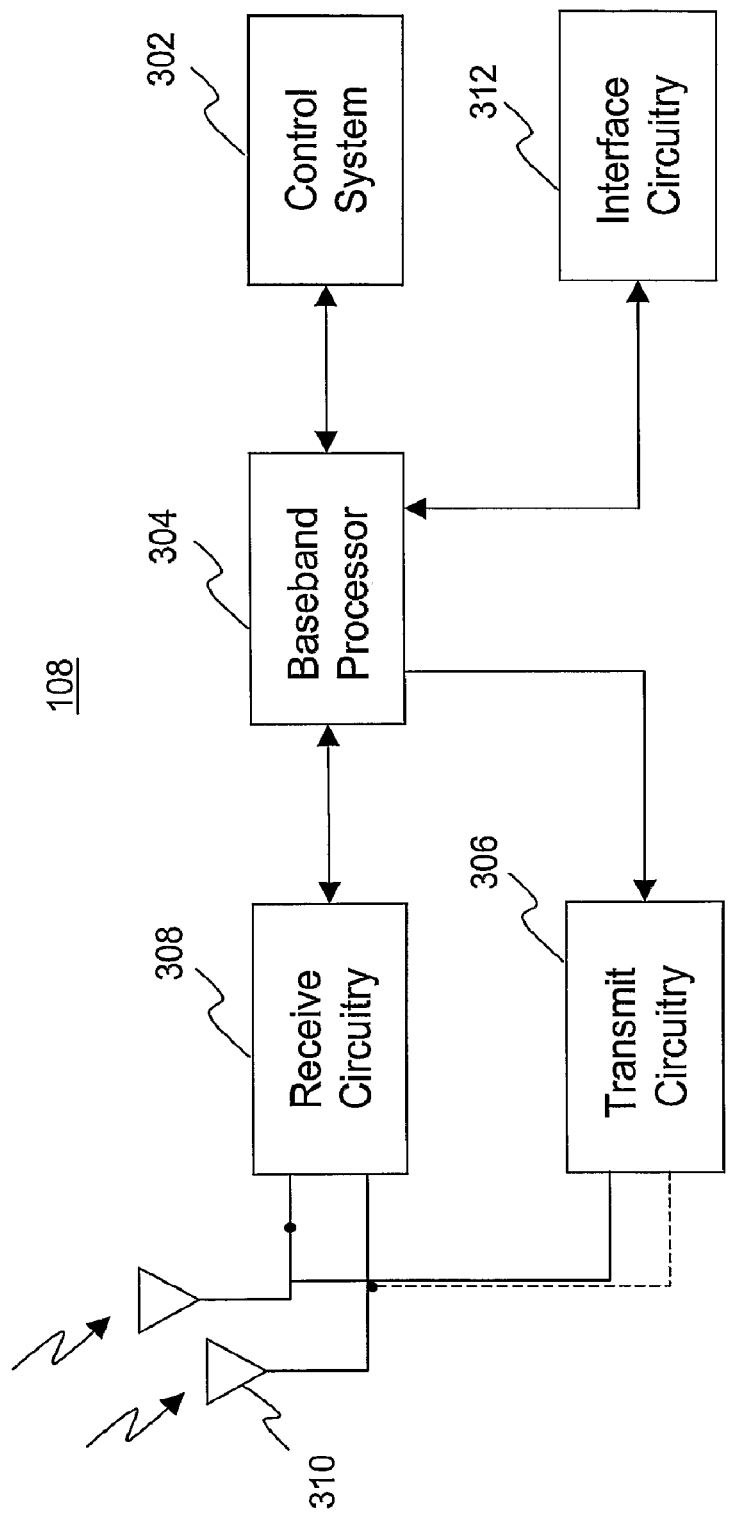
FIG. 3 is a block representation of a subscriber station according to one embodiment of the present invention.

With reference to FIG. 3, a subscriber station 108 configured according to one embodiment of the present invention is illustrated. Similarly to the base station 104, the subscriber station 108 will include a control system 302, a baseband processor 304, transmit circuitry 306, receive circuitry 308, multiple antennas 310, and user interface circuitry 312. The receive circuitry 308 receives radio frequency signals bearing information from one or more base stations 104. Preferably, a low noise amplifier and a filter (not shown) cooperate to amplify and remove broadband interference from the signal for processing. Downconversion and digitization circuitry (not shown) will then downconvert the filtered, received signal to an intermediate or baseband frequency signal, which is then digitized into one or more digital streams.

The baseband processor 304 processes the digitized received signal to extract the information or data bits conveyed in the received signal. This processing typically comprises demodulation, decoding, and error correction operations, as will be discussed in greater detail below. The baseband processor 304 is generally implemented in one or more digital signal processors (DSPs) and application specific integrated circuit (ASIC).

For transmission, the baseband processor 304 receives digitized data, which may represent voice, data, or control information, from the control system 302, which it encodes for transmission. The encoded data is output to the transmit circuitry 305, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 40 through a matching network (not shown). Various modulation and processing techniques available to those skilled in the art are applicable to the present invention.

In OFDM modulation, the transmission band is divided into multiple, orthogonal carrier waves. Each subcarrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation requires the performance of an Inverse Fast Fourier Transform (IFFT) on the information to be transmitted. For demodulation, the performance of a Fast Fourier Transform (FFT) on the received signal is required to recover the transmitted information. In practice, the Inverse Discrete Fourier Transform (IDFT) and Discrete Fourier Transform (DFT) may be implemented using digital signal processing for modulation and demodulation, respectively.

Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

Figure 4:
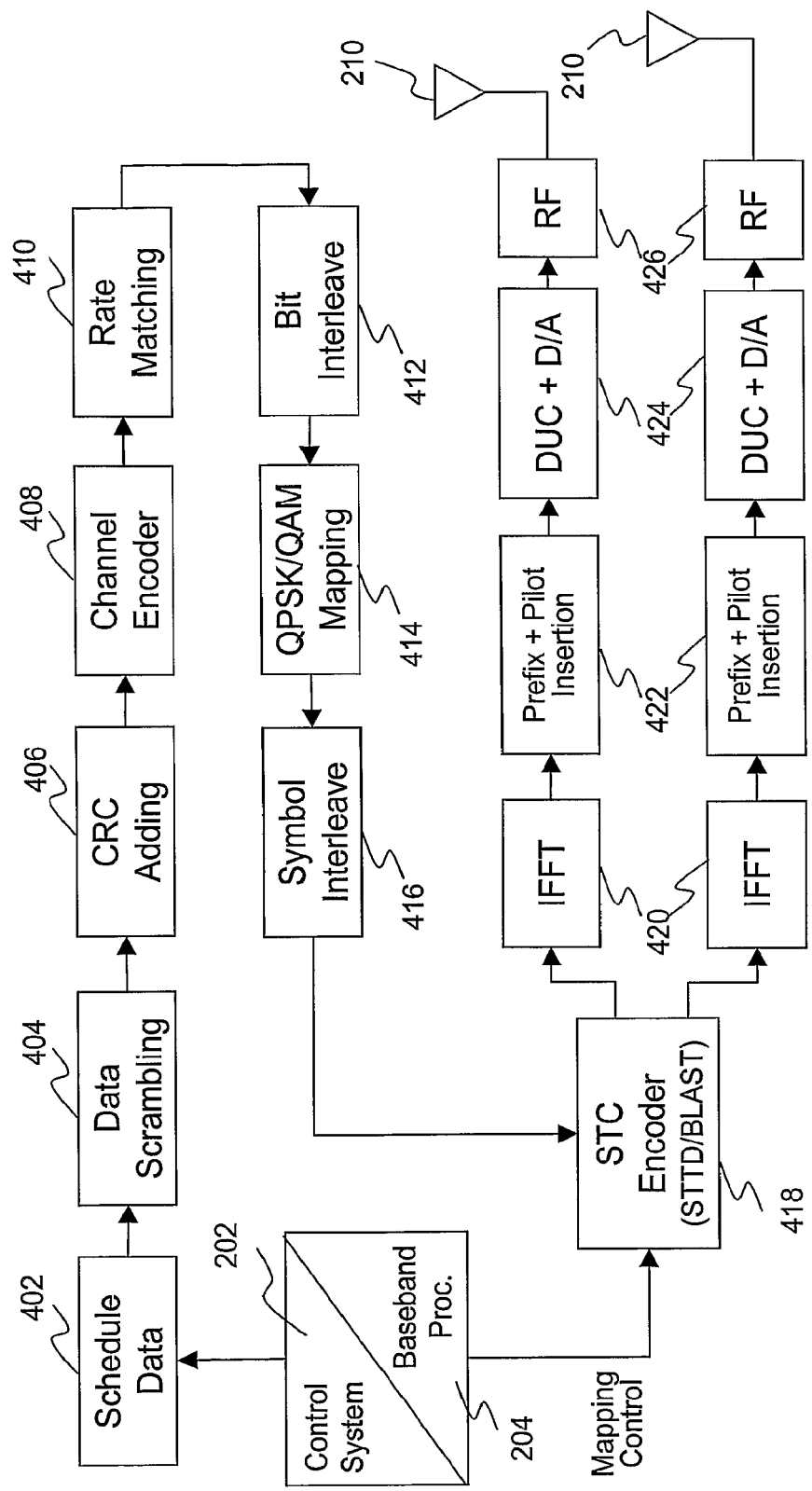
FIG. 4 is a logical breakdown of an OFDMA transmitter architecture according to one embodiment of the present invention.

With reference to FIG. 4, a logical OFDM transmission architecture is provided according to one embodiment. Initially, data 402 to be transmitted to a subscriber station 108 is received at the base station 104. The data is scrambled in a manner reducing the peak-to-average power ratio associated with the data using data scrambling logic 404. A cyclic redundancy check (CRC) for the scrambled data is determined and appended to the scrambled data using CRC logic 406. Next, channel coding is performed using channel encoder logic 408 to effectively add redundancy to the data to facilitate recovery and error correction at the subscriber station 108. The channel encoder logic 408 may use forward error correction techniques such as Concatenated Reed-Solomon-convolutional code (RS-CC), block turbo coding (BTC) or convolutional turbo codes (CTC). The encoded data is then processed by rate matching logic 410 to compensate for the data expansion associated with encoding.

Bit interleaver logic 412 systematically reorders the bits in the encoded data to ensure that adjacent coded bits are mapped onto nonadjacent subcarriers, thereby minimize the loss of consecutive data bits. This is considered the first step of a two step permutation. All encoded data bits shall be interleaved by a block interleaver with a block size corresponding to the number of coded bits per allocated subchannels per OFDM symbol. The second step ensures that adjacent coded bits are mapped alternately onto less or more significant bits of the constellation, thus avoiding long runs of lowly reliable bits.

The resultant data bits are mapped into corresponding symbols depending on the chosen baseband modulation by mapping logic 414. Binary Phase Shift Key (BPSK), Quadrature Amplitude Modulation (QAM), for example, 16-QAM and 64-QAM, or Quadrature Phase Shift Key (QPSK), for example, Gray mapped QPSK modulation may be used. When QAM is used, the subchannels are mapped onto corresponding complex-valued points in a $2^m$-ary constellation. A corresponding complex-valued $2^m$-ary QAM sub-symbol, $c_k = a_k + jb_k$, that represent a discrete value of phase and amplitude, where $-N \leq k \leq N$, is assigned to represent each of the sub-segments such that a sequence of frequency-domain sub-symbols is generated.

Each of the complex-valued, frequency-domain sub-symbols $c_k$ is used to modulate the phase and amplitude of a corresponding one of 2N+1 subcarrier frequencies over a symbol interval $T_s$.

The modulated subcarriers are each modulated according to a sine $x=(\sin x)/x$ function in the frequency domain, with a spacing of $1/T_s$ between the primary peaks of the subcarriers, so that the primary peak of a respective subcarrier coincides with a null the adjacent subcarriers. Thus, the modulated subcarriers are orthogonal to one another though their spectra overlap.

The symbols may be systematically reordered to further bolster the immunity of the transmitted signal to periodic data loss caused by frequency selective fading using symbol interleaver logic 416. For this purpose, specific Reed-Solomon permutation may be used to make the subchannels as independent as possible from each other. The independence of the subchannel allocation gives maximum robustness and statistically spreading interference between neighboring cells as well as neighboring carriers between two channels and statistically spreading the interference inside the cell.

At this point, groups of bits have been mapped into symbols representing locations in an amplitude and phase constellation. The STC encoder logic 418 will process the incoming symbols and provide n outputs corresponding to the number of transmit antennas 210 for the base station 104. The control system 202 and/or baseband processor 204 will provide a mapping control signal to control STC encoding. At this point, assume the symbols for the n outputs are representative of the data to be transmitted and capable of being recovered by the subscriber station 108.

For the present example, assume the base station 104 has two antennas 210 (n=2) and the STC encoder logic 418 provides two output streams of symbols. Accordingly, each of the symbol streams output by the STC encoder logic 418 is sent to a corresponding IFFT processor 420, illustrated separately for ease of understanding. Those skilled in the art will recognize that one or more processors may be used to provide such digital signal processing alone or in combination with other processing described herein. The IFFT processors 420 will preferably operate on the respective symbols using IDFT or like processing to effect an Inverse Fourier Transform. The output of the IFFT processors 420 provides symbols in the time domain.

It should be apparent to a person skilled in the art that the STC encoder may be a space time transmit diversity (STTD) encoder or a spatial multiplexing (SM) encoder employing, for example, Bell Labs Layered Space-Time (BLAST).

The time domain symbols are grouped into frames, which are associated with prefix and pilot headers by like insertion logic 422. Each of the resultant signals is up-converted in the digital domain to an intermediate frequency and converted to an analog signal via the corresponding digital up-conversion (DUC) and digital-to-analog (D/A) conversion circuitry 424. The resultant (analog) signals are then simultaneously modulated at the desired RF frequency, amplified, and transmitted via the RF circuitry 426 and antennas 210. Notably, the transmitted data is preceded by pilot signals, which are known by the intended subscriber station 108 and implemented by modulating the pilot header and scattered pilot subcarriers. The subscriber station 108, which is discussed in detail below, will use the scattered pilot signals for channel estimation and interference suppression and the header for identification of the base station 104.

Figure 5:
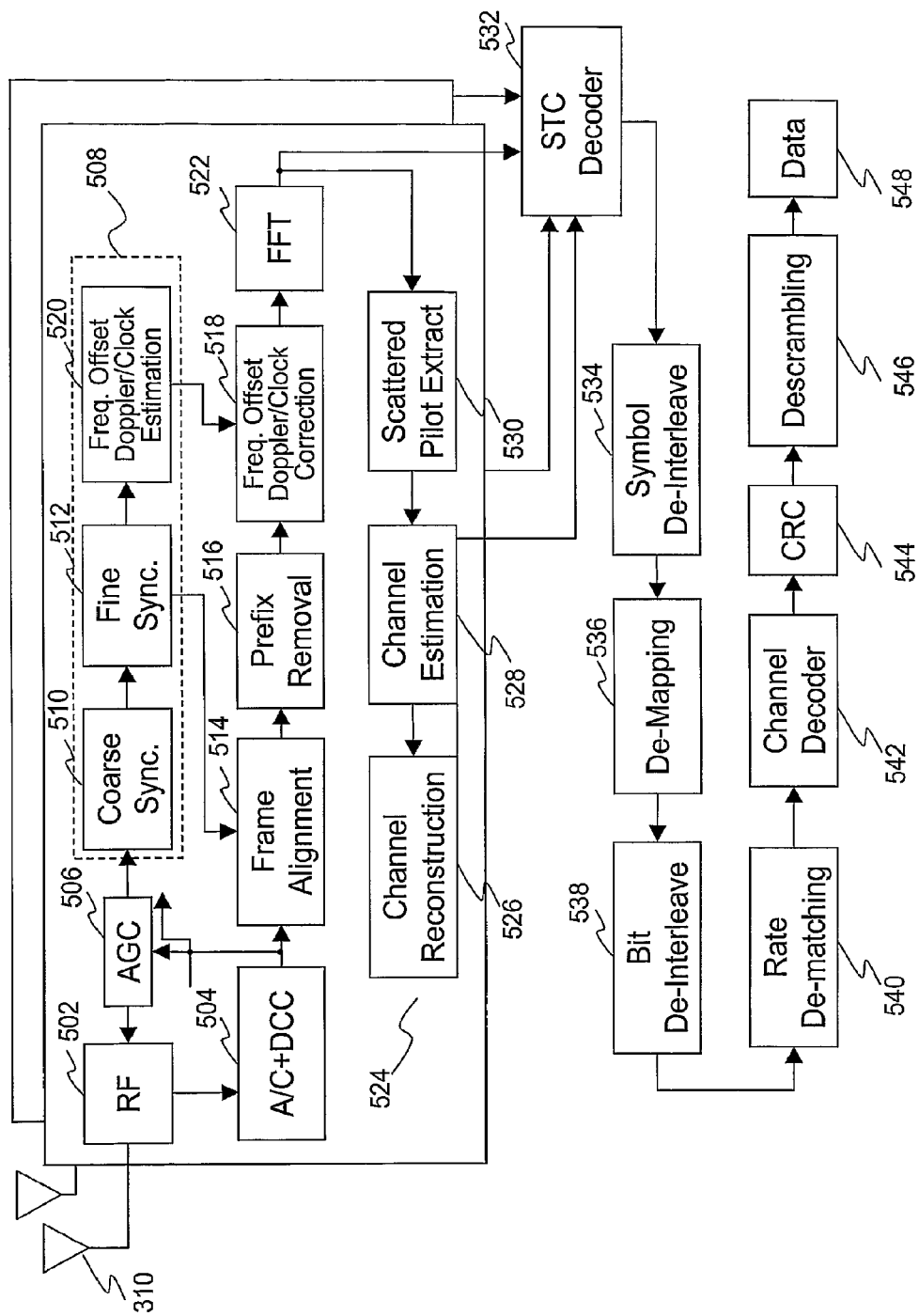
FIG. 5 is a logical breakdown of an OFDMA receiver architecture according to one embodiment of the present invention.

Reference is now made to FIG. 5 to illustrate reception of the transmitted signals by a subscriber station 108. Upon arrival of the transmitted signals at each of the antennas 310 of the subscriber station 108, the respective signals are demodulated and amplified by corresponding RF circuitry 502. For the sake of conciseness and clarity, only one of the two receive paths is described and illustrated in detail. Analog-to-digital (A/D) converter and down-conversion circuitry 504 digitizes and downconverts the analog signal for digital processing. The resultant digitized signal may be used by automatic gain control circuitry (AGC) 506 to control the gain of the amplifiers in the RF circuitry 502 based on the received signal level.

Preferably, each transmitted frame has a defined structure having two identical headers. Framing acquisition is based on the repetition of these identical headers. Initially, the digitized signal is provided to synchronization logic 508, which includes coarse synchronization logic 510, which buffers several OFDM symbols and calculates an auto-correlation between the two successive OFDM symbols. A resultant time index corresponding to the maximum of the correlation result determines a fine synchronization search window, which is used by the fine synchronization logic 512 to determine a precise framing starting position based on the headers. The output of the fine synchronization logic 512 facilitates frame acquisition by the frame alignment logic 514. Proper framing alignment is important so that subsequent FFT processing provides an accurate conversion from the time to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 516 and a resultant samples are sent to frequency offset and Doppler correction logic 518, which compensates for the system frequency offset caused by the unmatched local oscillators in the transmitter and the receiver and Doppler effects imposed on the transmitted signals. Preferably, the synchronization logic 508 includes frequency offset, Doppler, and clock estimation logic 520, which is based on the headers to help estimate such effects on the transmitted signal and provide those estimations to the correction logic 518 to properly process OFDM symbols.

At this point, the OFDM symbols in the time domain are ready for conversion to the frequency domain using the FFT processing logic 522. The results are frequency domain symbols, which are sent to processing logic 524. The processing logic 524 extracts the scattered pilot signal using scattered pilot extraction logic 526, determines a channel estimate based on the extracted pilot signal using channel estimation logic 528, and provides channel responses for all subcarriers using channel reconstruction logic 530. The frequency domain symbols and channel reconstruction information for each receive path are provided to an STC decoder 532, which provides STC decoding on both received paths to recover the transmitted symbols. The channel reconstruction information provides the STC decoder 532 sufficient information to process the respective frequency domain symbols to remove the effects of the transmission channel.

The recovered symbols are placed back in order using the symbol de-interleaver logic 534, which corresponds to the symbol interleaver logic 416 of the transmitter. The de-interleaved symbols are then demodulated or de-mapped to a corresponding bitstream using de-mapping logic 536. The bits are then de-interleaved using bit de-interleaver logic 538, which corresponds to the bit interleaver logic 412 of the transmitter architecture. The de-interleaved bits are then processed by rate de-matching logic 540 and presented to channel decoder logic 542 to recover the initially scrambled data and the CRC checksum. Accordingly, CRC logic 544 removes the CRC checksum, checks the scrambled data in traditional fashion, and provides it to the de-scrambling logic 546 for de-scrambling using the known base station de-scrambling code to recover the originally transmitted data.

In OFDM systems, only a single user can transmit on all of the subcarriers at any given time, and time division or frequency division multiple access may be employed to support multiple users. The major setback to this static multiple access scheme is the fact that the different users see the wireless channel differently is not being utilized. Orthogonal frequency division multiplexing access (OFDMA), on the other hand, allows multiple users to transmit simultaneously on the different subcarriers per OFDM symbol. In an OFDMA/TDMA embodiment, the OFDM symbols are allocated by TDMA method in the time domain, and the subcarriers within an OFDM symbols are divided by OFDMA method in frequency domain into subsets of subcarriers, each subset is termed a subchannel. The subcarriers forming one subchannel may, but need not be adjacent. These subchannels are the basic allocation unit. Each allocation of subchannel may be allocated for several OFDM symbols in such a way that the estimation of each subchannel is done in frequency and time. The subchannel may be spread over the entire bandwidth. This scheme achieves improved frequency diversity and channel usage without the need for frequency separation between subcarriers. The allocation of carriers to subchannel may be accomplished by special Reed-Solomon series, which enables the optimization and dispersion of interfering signals inside a cell and between adjacent cells. Therefore, in the OFDMA/TDMA embodiment, OFDM symbols are shared both in time and in frequency (by subchannel allocation) between different users. When the OFDMA is used in the uplink (UL), it allows users to operate with smaller power amplifiers, at expense of instantaneous data rate. On the other hand it allows allocating dynamically larger amounts of bandwidth to users capable of utilizing it in terms of the link budget. When applied to the downlink (DL), OFDMA allows transmitting to multiple users in parallel with designated data streams, and may improve the link budget of disadvantaged users by allocating to their suchannels a larger fraction of their downlink transmit power.

Unless defined otherwise, technical and scientific terms used herein have the same meaning as defined in IEEE 806.16-2004 and IEEE 806.16e (available at www.ieee802.org) which are incorporated by reference in their entireties.

Figure 6:
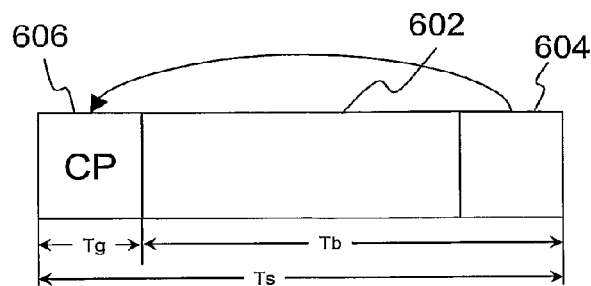
FIG. 6 (*a*) depicts an example of an OFDM symbol structure in time domain.
Figure 6:
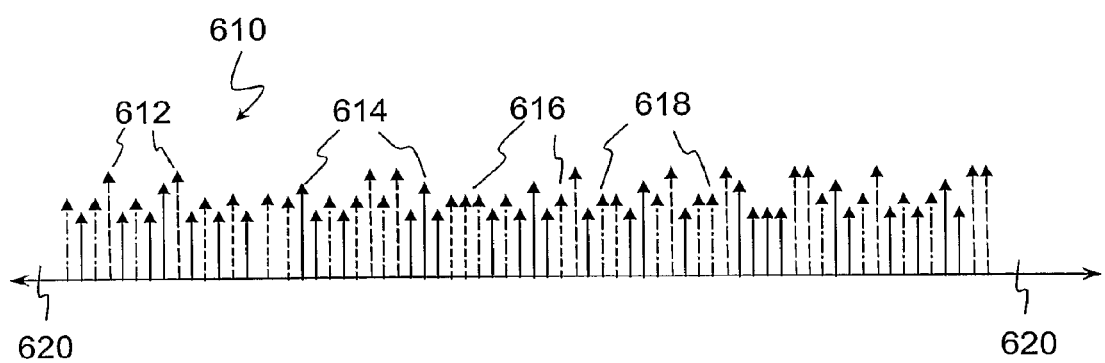

FIG. 6 shows the transmitted OFDM symbols arranged according to increasing time and increasing subcarrier frequency. The subcarrier frequencies contained within an OFDM symbol are each represented by circles. In the, time domain, the first two symbols 602 of a frame may be preamble symbols 610, for example, in the case of a downlink (DL) subframe. Preamble symbols 612 may also be embedded in the frame, for example, in the case of an uplink (UL) subframe. Data symbols 606 for data transmission, or scattered pilot symbols for various estimation purposes 604 are transmitted, depending on the subcarrier frequency, until the next preamble symbols are transmitted. Null subcarriers 608 means no transmission, and may be used for guard bands, non-active subcarriers and the DC subcarrier. The preamble may provide one of the following fundamental operations: fast base station access, base station identification and C/I ratio measurement, framing and timing synchronization, frequency and sampling clock offset estimation and initial channel estimation. The design of a frame preamble with minimized overhead is critical to maximum spectral efficiency and radio capacity.

FIG. 6a shows an example of an OFDMA symbol structure in time domain. OFDMA waveform is created by Inverse-Fourier-Transform. The time duration 602 is referred to as the useful symbol time $T_b$. A copy of a segment 704 (last $T_g$) of the useful symbol period 602, termed cyclic prefix (CP), is copied and appended to the beginning of the useful symbol time $T_b$ 606, and may be used to collect multipath, while maintaining the orthogonality of the tones. Using a cyclic extension, the samples required for performing the FFT at the receiver can be taken anywhere over the length of the extended symbol. This provides multipath immunity as well as a tolerance for symbol time synchronization errors.

An OFDMA symbol may be characterized by following primitive parameters: the nominal bandwidth (BW); the number of used subcarriers ($N_{used}$), for example, 1703; sampling factor n, which in conjunction with BW and $N_{used}$ determines the subcarrier spacing, and the useful symbol time, and the ratio of CP time $T_g$ to useful symbol time $T_b$ (G), for example, ¼, ⅛, ¹⁄₁₆ or ¹⁄₃₂.

Based on the primitive parameters, other parameters could be derived: the FTT size $N_{FFT}$ which is the smallest power of two greater than $N_{used}$, for the above example of $N_{used}=1703$, $N_{FFT}$ is 2048; sampling frequency $F_s$=floor (n·8/7·BW/ 8000)×8000; Subcarrier spacing: $\Delta f = F_s/N_{FFT}$; useful symbol time: $T_b=1/\Delta f$; CP Time: $T_g=G \cdot T_b$; OFDMA Symbol Time: $T_s=T_b+T_g$; and sampling time: $T_b/N_{FFT}$.

Referring to FIG. 6b, a basic structure of an OFDMA symbol 610 is described in frequency domain. As discussed in the above, an OFDMA symbol is made up of subcarriers 612-618, the number of which generally correlates to the FFT size used. There may be several subcarrier types; data subcarriers 612, 616, 618 are used for data transmission; pilot subcarriers 614 are used for various estimation purposes; and null carrier has no transmission at all, for guard bands 620 and DC carrier. Guard bands 620 are used to enable the signal to naturally decay and create the FFT "brick wall" shaping. In OFDMA, active subcarriers are divided into subsets of subcarriers, each subset is termed a subchannel. The symbol is divided into subchannels to support scalability, multiple access, and advanced antenna array processing capabilities. In FIG. 6 (b), three distinct subchannels 612, 616, and 618 are illustrated. Tens and hundreds of subchannels may be implemented. In the downlink, a subchannel may be intended for different (groups of) receivers; in the uplink, a transmitter may be assigned one or more subchannels, several transmitters may transmit simultaneously. The subcarriers forming one subchannel may, but need not be adjacent.

Figure 7:
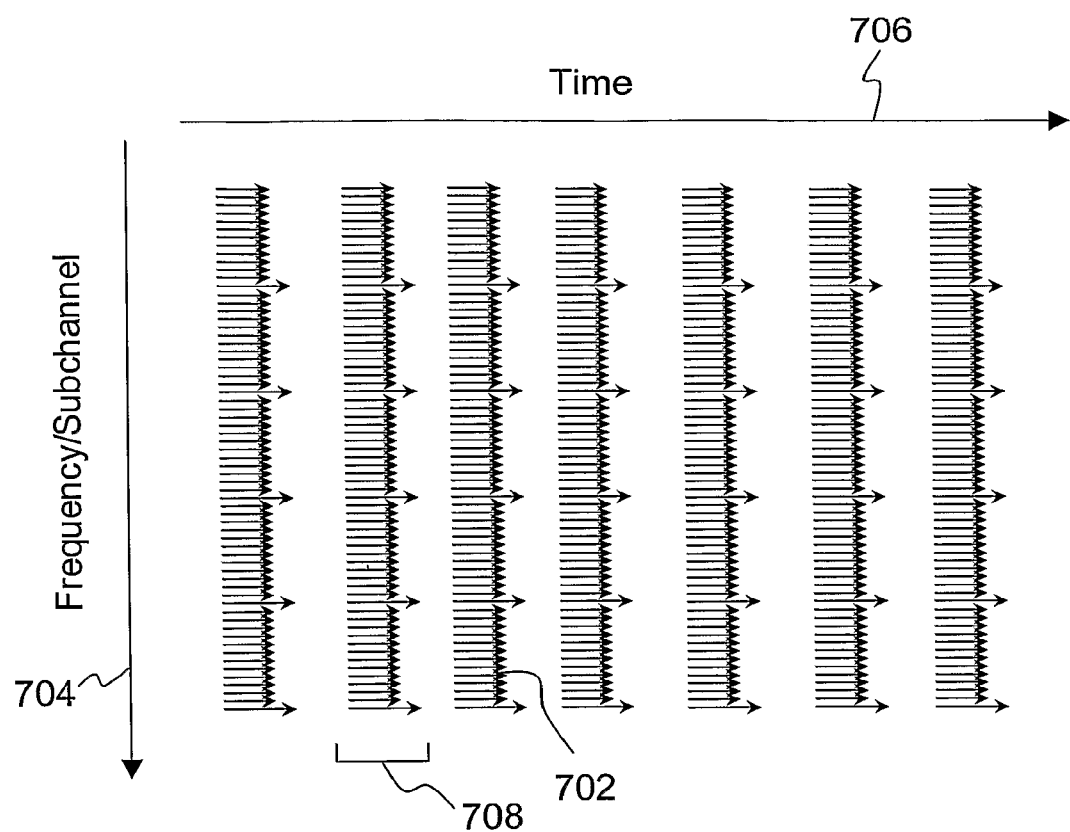
FIG. 7 shows an example of subchannel arranged in frequency domain.

In FIG. 7, each horizontal arrow 702 in the frequency domain 704 represents a logical subchannel. The symbol is divided into subchannels to support scalability, multiple access, and advanced antenna array processing capabilities. A minimum number of symbols are allocated to one subchannel, this may be accomplished by special Reed-Solomon series, which enable the optimization and dispersion of interfering signals inside a cell and between adjacent cells. Each subchannel is the basic allocation unit that a user can be allocated. In the time domain 706, OFDM symbols 708 are shown in columns as FIG. 7.

Figure 8:
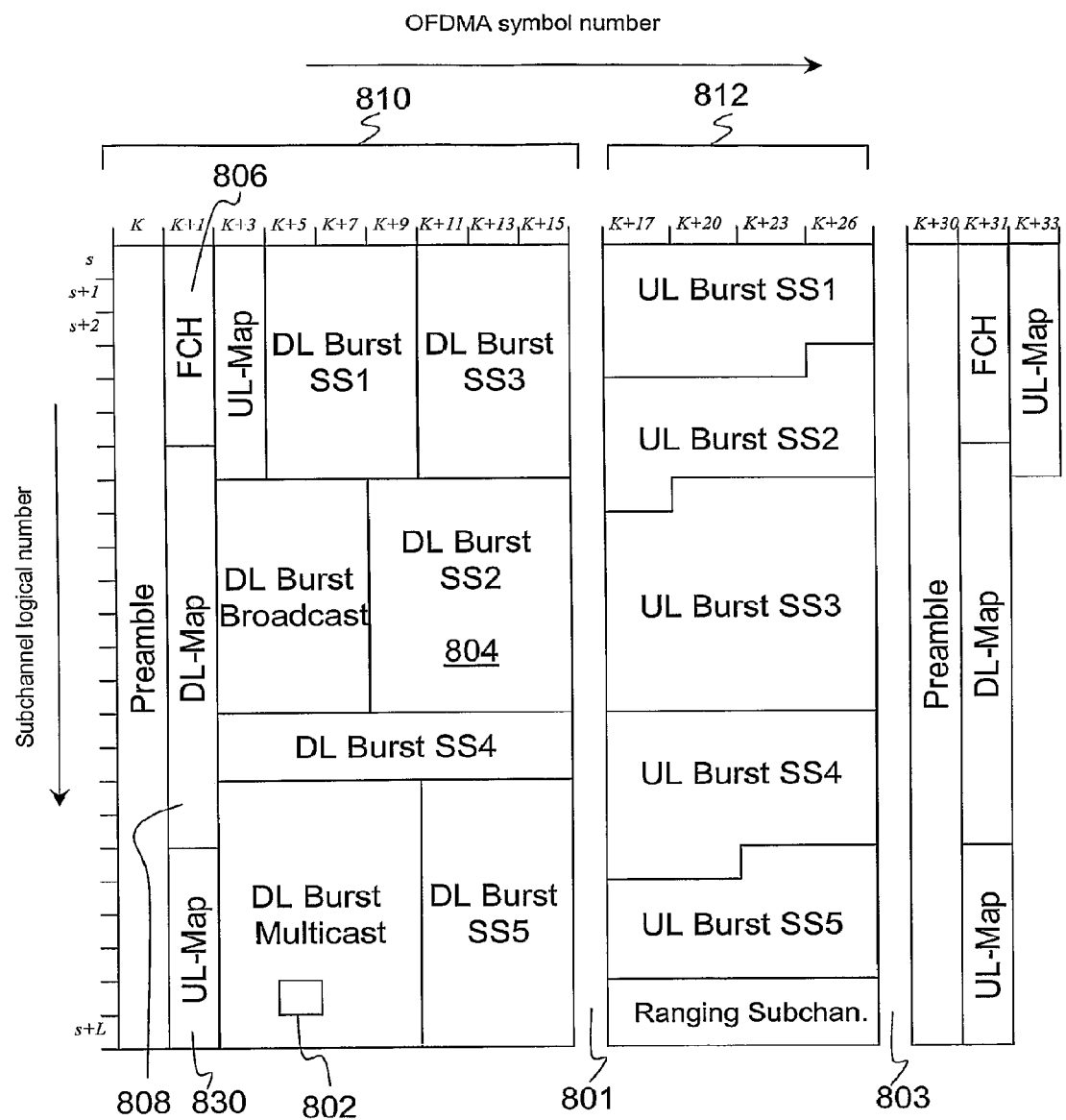
FIG. 8 shows a time plan for the OFDMA frame structure in time division duplex (TDD)mode.

When in a time plan such as the one illustrated in FIG. 8, a slot 802 is defined as a pair of an OFDM time symbol number and a subchannel logical number. A subchannel is the minimum possible data allocation unit, and its size may vary for uplink and downlink, for full used subchannelization (FUSC) and partially used subchannelization (PUSC), and for the distributed subcarrier permutations and the adjacent subcarrier permutation, between one subchannel by one OFDMA symbol to one subchannel by three OFDMA symbols. For example, in DL and UL PUSC which will be discussed below, the DL and UL subframe size and the granularity of the DL and UL allocations are one by two or one by three OFDM symbols, respectively. These slots may be referred to as clusters or tiles composing two and three OFDM symbols, respectively.

In OFDMA, a data region is a two-dimensional allocation of a group of contiguous subchannels, in a group of contiguous OFDMA symbols. Examples of data regions are shown in FIG. 8.

The DL-MAP message, if transmitted in the current frame, is the first MAC PDU in the burst following the FCH. An UL-MAP message follows immediately either the DL-MAP message (if one is transmitted) or the DLFP. If Uplink Channel Descriptor (UCD) and Downlink Channel Descriptor (DCD) messages are transmitted in the frame, they follow immediately the DL-MAP and UL-MAP messages.

Simultaneous DL allocations can be broadcast, multicast, and unicast and they can also include an allocation for another base station rather than a serving base station. Simultaneous ULs can be data allocations and ranging or bandwidth requests.

There are two major subchannel allocation methods in the downlink: partial usage of subchannels (PUSC) where some of the subchannels are allocated to the transmitter, and full usage of the subchannels (FUSC) where all subchannels are allocated to the transmitter. In FUSC, there is one set of common pilot subcarriers, but in PUSC, each subchannel contains its own set of pilot subcarriers.

For FUSC in the downlink 810, the pilot tones are allocated first; then the zero carriers, then all the remaining subcarriers are used as data subcarriers, which are divided into subchannels that are used exclusively for data. There are two variable pilot-sets and two constant pilot-sets. In FUSC, each segment uses both sets of variable/constant pilot-sets.

Assuming an FTT size of 2048 is used, each subchannel in FUSC may comprise 48 subcarriers. The subchannel indices may be formulated using a Reed-Solomon series, and is allocated out of the data subcarriers domain. The data subcarriers domain includes 48*32=1536 subcarriers, which are the remaining subcarriers after removing from the subcarrier's domain (0-2047), the variable set and the constant set of pilots, guard subcarriers and the DC subcarrier.

The 1536 data subcarriers are partitioned into groups of contiguous subcarriers. Each subchannel consists of one subcarrier from each of these groups. The number of groups is therefore equal to the number of subcarriers per subchannel, $N_{subcarrier}$. The number of the subcarriers in a group is equal to the number of subchannels, $N_{subchannels}$. The partitioning of subcarriers into subchannels can be expressed in the following permutation formula.

$$\text{subcarrier}(k,s) = N_{subchannels} \cdot n_k \{p_s[n_k \bmod N_{subchannels}] + \text{IDCell}\} \bmod N_{subchannels}$$

Wherein subcarrier (k,s) is the subcarrier index of subcarrier n in subchannel s, s is the index number of a subchannel, from the set [0 . . . $N_{subchannels}-1$], $n_k=$ (k+13·s)mod $N_{subchannels}$, where k is the subcarrier-in-subchannel index from the set [0 . . . $N_{subchannels}-1$], $N_{subchannels}$ the number of subchannels, $p_s[j]$ is the series obtained by rotating {PermutationBase$_0$} cyclically to the left s times, ceil[ ] is the function that rounds its argument up to the next integer, ID cell is an integer ranging from 0 to 31, which identifies the particular base station segment and is specified by MAC layer, and $X_{mod(k)}$ is the remainder of the quotient X/k (which is at most k−1).

For PUSC in the downlink or in the uplink 810, the set of used subcarriers is first partitioned into subchannels, and then the pilot subcarriers are allocated from within each subchannel.

Figure 9:
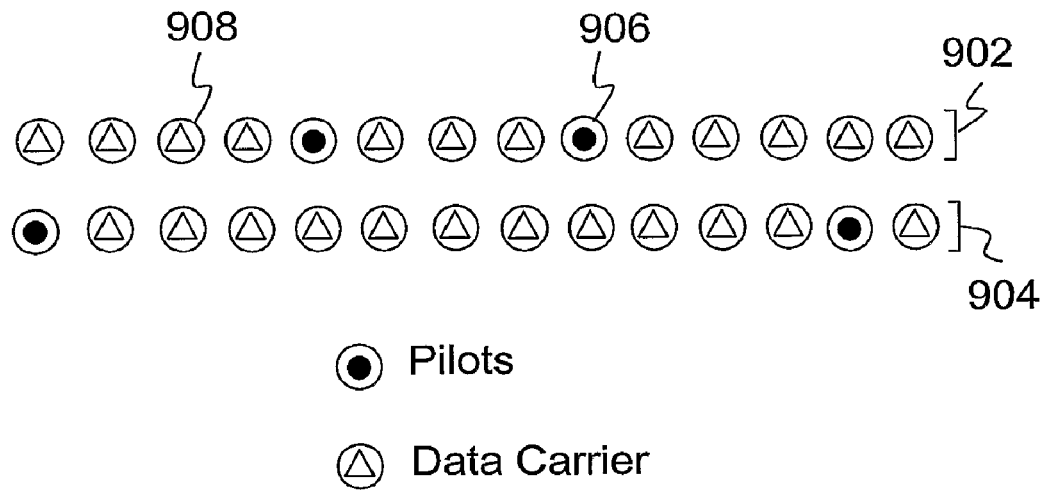
FIG. 9 (*a*) shows an example of a cluster.
Figure 9:
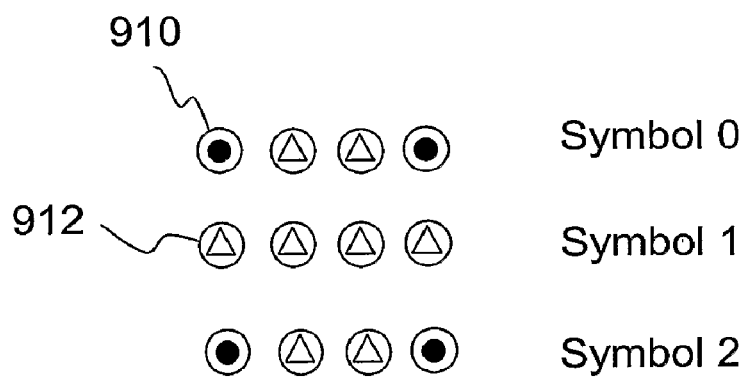

In a downlink using PUSC, a symbol is first divided into basic clusters as illustrated in FIG. 9 (*a*). Pilots 906 and data carriers 908 are allocated within each cluster 902 904. For an OADM symbol of FFT size 2048, the'number of used subcarriers, after subtracting the guard subcarriers (367), is 1681. Each cluster may have 14 subcarriers for a total of 120 clusters. For the 60 subchannels the allocation of subcarriers is as following:

1) Dividing the subcarriers into 120 physical clusters containing 14 adjunct subcarriers each (starting from carrier 0).

2) Renumbering the physical clusters into logical clusters using the following formula (As illustrated in FIG. 8, the first PUSC zone of the downlink, the default IDcell is 0):

$$\text{LogicalCluster} = \text{RenumberingSequence}((\text{PhysicalCluster} + 13 \cdot \text{IDcell}) \bmod 120)$$

3) Dividing the clusters into six major groups.

4) Allocating carriers to subchannel in each major group is performed by first allocating the pilot carriers within each cluster, and then taking all remaining data carriers within the symbol and using the same procedure as described above.

Referring to FIG. 8, an uplink 812 using PUSC, following a downlink 810 may also support up to three segments. For an OFDM symbol with FFT size 2048, a burst in the uplink may be composed of three time symbols and one subchannel, the three time symbols and one subchannel is termed a tile. Within each burst, there are 48 data subcarriers and 24 fixed-location pilot subcarrier, a total of 70 subchannels may be supported. The subchannel is constructed from six uplink tiles, each tile has four subcarriers per symbol. FIG. 9 (*b*) shows the structure of a tile with data subcarrier 912 and pilot subcarrier 910.

The permutation PUSC in UL is based on the allocation of tiles to subchannels through following steps:

1) Divide the 420 tiles into six groups, containing 70 adjacent tiles each.

2. Choose six tiles per subchannel based on $$\text{Tile}(s, n) = 70 \cdot n + (Pt[(s+n) \bmod 70] + \text{UL\_IDcell}) \bmod 70$$

wherein n is the tile index 0 ... 5, Pt is the tile permutation, s is the subchannel number; UL_IDcell is an integer value in the range 0 ... 69, which is set by the MAC layer.

After allocating the tiles for each subchannel the data subcarriers per subchannel are allocated as follows:

1) After allocating the pilot carriers within each tile, indexing the data subcarriers within the subchannels is performed starting from the first symbol at the lowest subcarrier from the lowest tile and continuing in an ascending manner throughout the subcarriers in the same symbol, then going to next symbol at the lowest data subcarrier, and so on. Data subcarriers shall be indexed from 0 to 47.

2) The allocation of the subcarriers is as follows:

$$\text{subcarrier}(n, s) = (n + 13 \cdot s) \bmod N_{subcarriers}$$

wherein n is a running index 0 ... 47, s is the subchannel number, $N_{subcarriers}$ is the number of subcarriers per subchannel.

There are two main types of subcarrier permutations: distributed and adjacent. In general, distributed subcarrier permutations perform well in mobile applications while adjacent subcarrier permutations can be properly used for fixed, portable, or low mobility environments.

OFDMA DL and UL subframes start in DL and UL PUSC mode, respectively. In DL PUSC, subchannels may be divided and assigned to three segments that can be allocated to sectors of the same cell. A sector of a cell may be portioned through means known to a Person skilled in the art, for example, through directional beam.

The available OFDMA subchannels may be divided into subset for deploying a single instance of the MAC, the subset is called a segment. A segment may include all available subchannels. In PUSC, for example, any segment has at least 12 subchannels. Therefore, a downlink may be divided into a three segments and a preamble structure which begins the transmission. The preamble subcarriers at the beginning of downlink may be also divided into three carrier-sets, each of them may be used by one of the segments in the following manner: segment 0 uses preamble carrier-set 0; segment 1 uses preamble carrier-set 1; and segment 2 uses preamble carrier-set 2.

Figure 10:
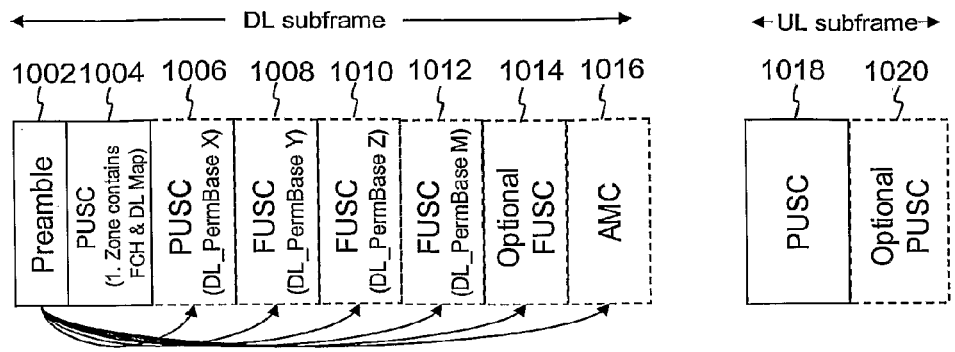
FIG. 10 (*a*) illustrates an OFDMA frame with multiple zones.
Figure 10:
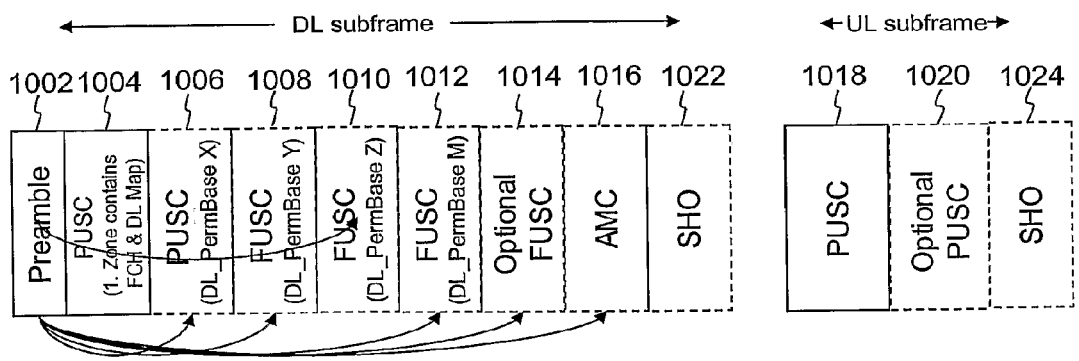

Permutation zone is a number of contiguous OFDMA symbols, in the DL or the UL, that use the same permutation formula. The DL subframe or the UL subframe may contain more than one permutation zone. An OFDMA frame may include multiple zones as illustrated in FIG. 10. Although the zones in FIG. 10 are shown as vertical columns spanning all the subchannel logical numbers, it should be apparent to a person skilled in the art that a permutation zone may also have other irregular shapes on a TDD time plan such as the one illustrated in FIG. 8.

FIG. 10 (*a*) illustrates zone switching within the DL and UL subframes. The switching is performed using an information element included in DL-MAP and UL-MAP.DL and UL subframes both start in PUSC mode where groups of subchannels are assigned to different segments by the use of dedicated FCH messages. The PUSC subcarrier allocation zone 1004 can be switched to a different type of subcarrier allocation zone through a directive from the PUSC DL-MAP 1004. FIG. 10 (*a*) shows the zone switching from the perspective of a PUSC segment. In FIG. 10 (*a*), the first zone PUSC contains FCH and DL-MAP 1004 is followed with another possibly data PUSC zone with a parameter "DL_PermBase X" 1006. A FUSC zone for another sector/cell with "DL_PermBase Y" 1008 is allocated next, followed by an FUSC zone for "DL_PermBase Z" 1010. A switching to FUSC "DL_PermBase M" 1012 can then be planned. Optional PUSC, FUSC 922, and AMC 924 zones in DL subframes and optional PUSC 1020 and AMC zones in UL subframes can be similarly scheduled. Allocation of AMC zones support simultaneously fixed, portable, and nomadic mobility users along with high mobility users.

Referring to FIG. 1, when a subscriber station 108*b* enters the network initially, coarse synchronization correlation is performed based on the preamble header in the time domain to determine a coarse synchronization location. At the coarse synchronization location, a fine synchronization search window is identified. An FFT is computed, and the system switches to a common synchronization channel to perform fine synchronization within the fine synchronization search window. The strongest correlation peaks are then identified, and the relevant time index are used as the candidate timing synchronization positions. An FFT is computed at each candidate timing synchronization position, and the system switches to the pilot channel.

The pseudo-noise (PN) sequences for all base stations 104 are correlated, and correlation peaks are selected to define an index corresponding to all candidate timing synchronization positions. The ORs for these base stations 104 are identified. The base station with highest CIR is selected as the serving base station, and the base stations 104 with CIRs greater than a given threshold are also selected for an active set list. If more than one base station 104 is on the active set list, the soft handoff procedures of the present invention are initiated. The FFT is then computed and the fine synchronization is provided using the PN code for each of the selected base station(s) 104.

In operation, downlink communications from a base station 104 to a subscriber station 108 are initiated by the subscriber station 108. Each subscriber station 108 constantly measures all of the possible pilot signal strengths of transmissions from adjacent base stations 104, identifies the strongest pilot signals, and compares them against a defined threshold. If the pilot signal strength for a base station 104 exceeds the defined threshold, that base station 104 is added to an active set list. Each subscriber station 108 will notify the base stations 104 of their active set lists. If there is only one base station 104 in the active set list, that base station 104 is singled out to service the subscriber station 108. If there is more than one base station 104 on the active set list, a soft handoff is enabled between those base stations 104. The soft handoff condition will continue until only one base station 104 is on the active set list, wherein the lone base station 104 will continue to serve the subscriber station 108. During soft handoff, all base stations 104 on the active set list will facilitate communications with the subscriber station 108 as defined below. Preferably, the base station controller 102 keeps track of all of the active set lists for the respective subscriber stations 108. The subscriber station 108 will keep track of their individual active set lists.

Accordingly, by providing the set list to the base station controller 102 and the servicing base station 104, the subscriber station 108 identifies the sole servicing base station 104 or triggers a soft handoff (SHO) mode when multiple base stations appear on the active set list. During a SHO mode, the base station controller 102 multicasts data packets intended for the subscriber station 108 to each of the base stations 104 on the active set list through macro-diversity. Multicasting indicates that each data packet is sent to each base station 104 on the active set list for transmission to the subscriber station 108. Alternatively, "non-redundant transmission" i.e. the data packets are divided into sub-packets in some manner and each sub-packet is sent to one of the base stations 104 on the active set list for transmission to the subscriber station 108, may also be implemented.

Exemplary process for identifying base station 104 to place them on the active list, as well as exemplary flow of an active SHO process has been described in PCT Application PCT/IB03/00153, filed in January 2003, and published as WO03/081938 on Oct. 2, 2003, which is incorporated herein by reference in its entirety.

In accordance with one embodiment of the present invention, there is an SHO zone defined for the soft handoff mode. Referring to FIG. 10 (b), an SHO zone 1022 is illustrated as a zone in the DL subframe, and an SHO 1024 as a zone in the UL subframe in time plan diagram. For PUSC, FUSC, AMC, optional FUSC or any other zones apparent to a person skilled in the art, such as Tile Usage of Subchannels (TUSC), in DL can be applied to SHO. Similarly, the PUSC, Optional PUSC or AMC zones in UL can be applied to SHO. Hence, the subscriber stations on the active list use the same subchannel definition, for example, permutation in OFDMA as defined in the SHO zone. This soft hand-off based macro-diversity transmission enables the concurrent transmissions to a target subscriber station from multiple base stations. Advantageously, this allows the subscriber station to exploit the macro-diversity gain to enhance both high speed user bit rate coverage and seamless hand-off of real-time service.

In one embodiment of the present invention, the DL SHO based macro-diversity provides RF combining. The DL macro-diversity RF combining turns interference into signal, hence significantly improves CIR and increases data throughput. The DL macro-diversity RF combining is transparent to the subscriber station reception operation, and enables simple subscriber station backward compatibility.

An SHO zone may be defined by the OFDMA downlink STC_ZONE_IE by setting the IDcell=0. For the SHO-base stations joint transmission, for the STC capable subscriber station, the total N antennas of SHO-base stations constitute an antenna pool. A pre-determined antenna selection formula may be used.

The MIMO pilot transmission for two-antenna transmission in PUSC and FUSC modes may follow the arrangement, for example, described in FIG. 245 and 8.4.8.1.2.1.2 of IEEE802.16-2004, respectively.

The MIMO pilot transmission for four-antenna transmission in PUSC and FUSC modes may follow the arrangement, for example, described in FIG. 251 and 8.4.8.2.2 of IBEE802.16-2004, respectively. The un-selected antennas may be set to the null transmission.

Subscriber station demodulates signal in the same procedure as in non-SHO mode if it does not receive MIMO_in_another_BS_IE( ) or Macro_MIMO DL Basic IE( ). The same data are transmitted from multiple base stations in the same data regions.

As described below, subscriber station may perform RF or diversity combining. Subscriber station may further perform soft data combining when it receives MIMO_in_another_BS_IE( ). In this case, the same data are transmitted in the same or different data regions.

Subscriber station demodulates signal in the same procedure as in non-SHO mode, it performs soft combining for those data regions with the same packet index when it receives Macro_MIMO DL Basic IE( ). This scheme benefits from combination of RF, diversity combining and soft data combining.

Table 1 is shows an example of IMO_in_another_BS_IE ( ).

| Syntax | Size (Bits) | Notes |
|---|---|---|
| IMO_in_another_BS_IE ( ) { | | |
|   Extended-2 DIUC | 4 | MIMO in another BS IE = 0x04 |
|   Length | 8 | variable |
|   Segment | 2 | Segment number |
|   Used subchannels | 6 | Used subchannels at other BS<br>Bit #0 : 0-11<br>Bit #1 : 12-19<br>Bit #2 : 20-31<br>Bit #3 : 32-39<br>Bit #4 : 40-51<br>Bit #5 : 52-59 |
|   IDCell | 5 | Cell ID of other BS |
|   Num-Region | 4 | |
|   for (i=0; i<Num_Region; i++) { | | |
|     Matrix_indicator | 2 | STC matrix (see 8.4.8.1.4 of IEEE802.26-2004)<br>STC = STC mode indicated in the latest STC_Zone _IE ( ).<br>if (STC = 0b01) and Ant23 =0){<br>  0b00 = Matrix A<br>  0b01 = Matrix B |

-continued

| Syntax | Size (Bits) | Notes |
|---|---|---|
| | | 0b10 = Matrix C |
| | | 0b11 = Reserved |
| | | } |
| | | elseif (STC = 0b01 and Ant23 =1) or (STC = 0b10){ |
| | | 0b00 = Matrix A |
| | | 0b01 = Matrix B |
| | | 0b10 = Matrix C |
| | | 0b11= Reserved |
| | | } |
| | | else { |
| | | 0b00-0b11 = Reserved |
| | | } |
| OFDMA Symbol offset | 8 | |
| Subchannel offset | 6 | |
| Boosting | 3 | Refer to Table 273. |
| No. OFDMA. Symbols | 7 | |
| No. subchannels | 6 | |
| Num _layer | 2 | |
| For (i=0; j<Num_Layer; j++){ | | |
|   If (INC_SID = I){ | | |
|     CID | 16 | — |
|   } | | |
|   Layer_ index | 2 | — |
|   DIUC | 4 | 0-11 burst profiles |
|   } | | |
| } | | |
| } | | |

Figure 11:
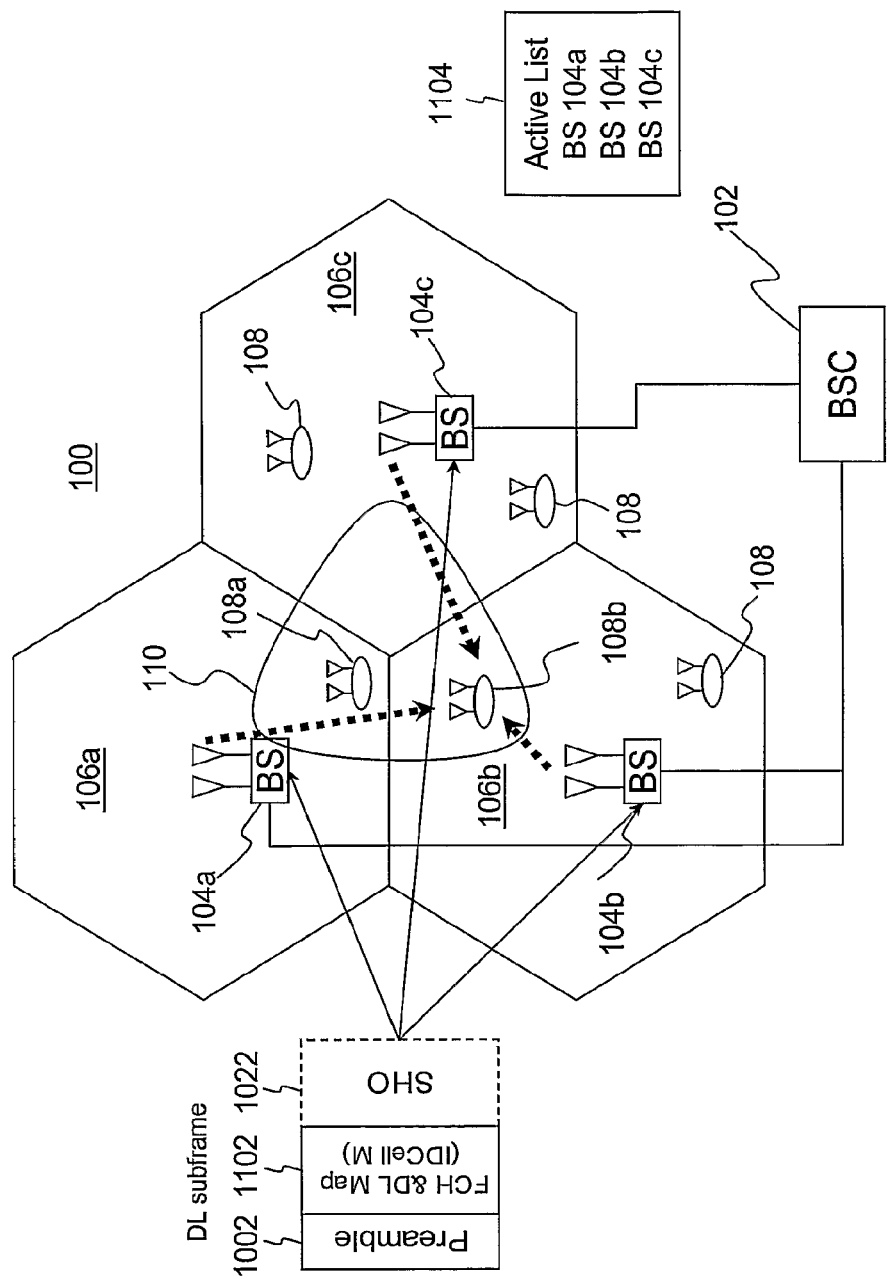
FIG. 11 shows a block representation of a cellular communication system with a soft handoff zone.

Referring to FIG. 11, to achieve RF combining in PUSC with same permutation and the same connection identifier (CID) in each cell 106, an SHO Zone 1022 with a common IDcell M 1102 may be used. the base stations in an active set 1104 transmit the same data in the data region as defined, for example in a downlink map (DL_MAP). A CID may be defined as a 16 bit value that identifies a connection to equivalent peers in the MAC of the base station and subscriber station. Subscriber station 108b uses the same procedure to decode data as in non-SHO mode. Signals from multiple base stations are energy combined at subscriber station 108b if the relative delays within active base stations are smaller than a communication signal prefix or a pre-defined value. Base stations with relative delays larger than the prefix or the pre-defined value can turn off their transmission in this data region to achieve interference avoidance. Base stations preferably coordinate their schedulers such that different subscriber stations use different data regions.

Figure 12:
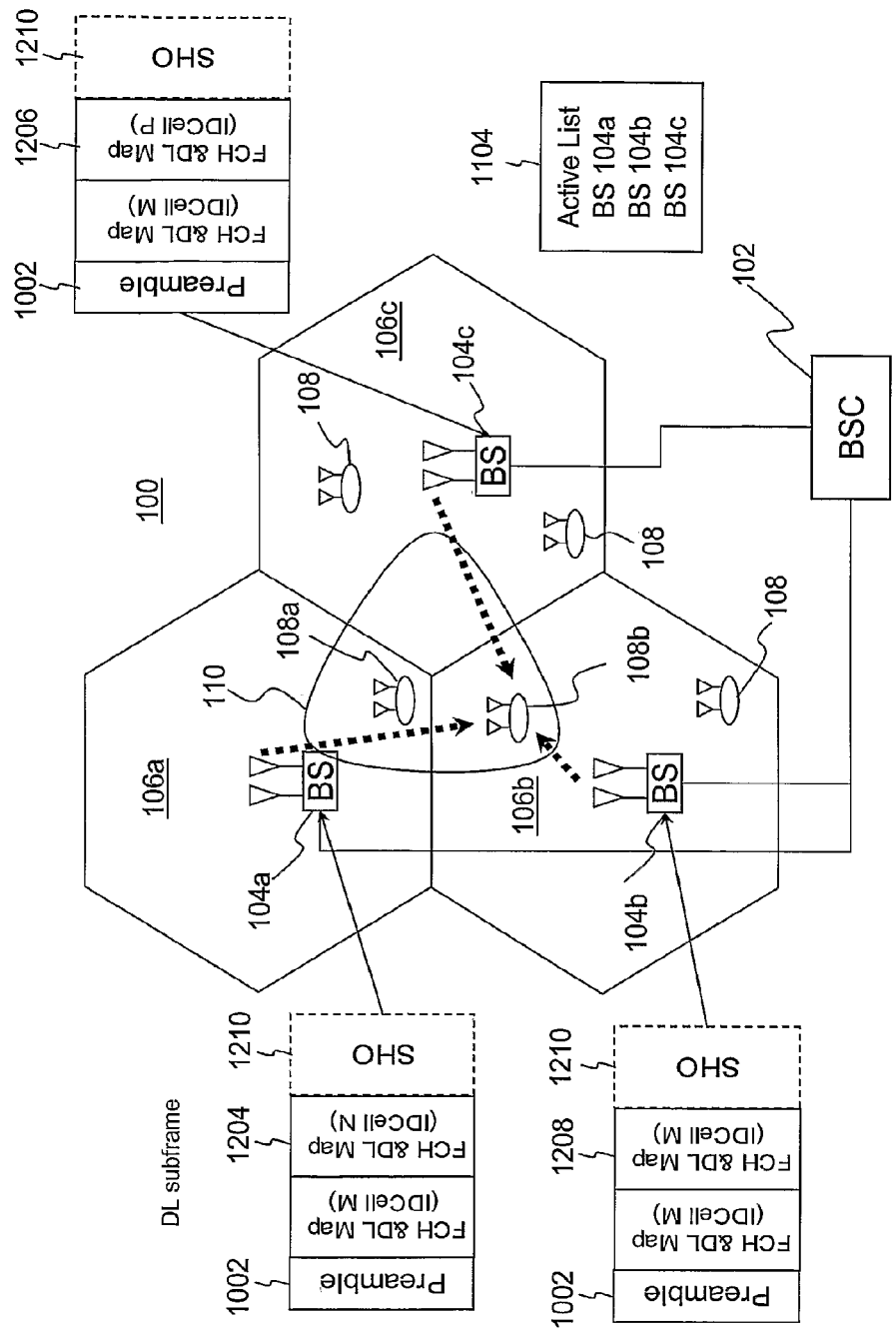
FIG. 12 is a block representation of a cellular communication system with different permutations arrangement and an additional identical permutation for soft handoff.

A second embodiment to achieve RF combining in PUSC is illustrated in FIG. 12. Each BS PUSC allocation is based on a default arrangement 1204, 1206, 1208, therefore each sector PUSC is allocated based on different permutations. However, collaborative transmission base stations in the active set each transmit additional PUSC segments 1210 with the subchannel definition, for example, permutation identical to the anchor segments.

To achieve RF in a DL FUSC with same subchannel definition, for example, permutation and the same CID in each cell, as described above, in a SHO Zone where a common IDcell is used, the base stations in an active set transmit the same data in a data region defined, for example, in DL_MAP. Subscriber station uses the same procedure to decode data as in non-SHO mode. Signals from multiple base stations are energy combined if the relative delays within active base stations are smaller than the prefix or a pre-defined value. Base stations with relative delays larger than the prefix or the pre-defined value can turn off their transmission in this data region to achieve interference avoidance. Base stations preferably coordinate their schedulers such that different subscriber stations use different data regions and to avoid interference to channel estimation.

In another embodiment of the present invention, the DL SHO based macro-diversity provides soft combining. To achieve the soft combining, same DL transmission format is mapped onto different PHY subchannels and transmitted over different macro-diversity branches. The subscriber station separately demodulates different macro-diversity versions and combines received packets at Log Likelihood Ratio (LLR) level, which is the natural logarithm of the probabilities that the information transmitted assumes its two possible values. Therefore, the soft combining of macro-diversity gain is achieved. As an example, in PUSC with same permutation and same CID in each cell, additional segment may be used. Base stations in an active set transmit the same data and use the same data randomizer Subscriber station demodulates signals from each base station, combines soft bits from each base station, and then decodes the data based on the combined soft bits, e.g. LLR combining. In this case, subscriber station processes the data from all serving base stations separately and may apply maximal ratio combining, for example. Each base station can use a different subchannel. Since all serving base stations should have the same CID, a centralized controller or MAP modification may be used to resolve the CID collision between serving base stations.

In another embodiment of the present invention, the DL SHO based macro-diversity provides interference avoidance for PUSC/FUSC with same permutation and the same CID in each cell.

Figure 13:
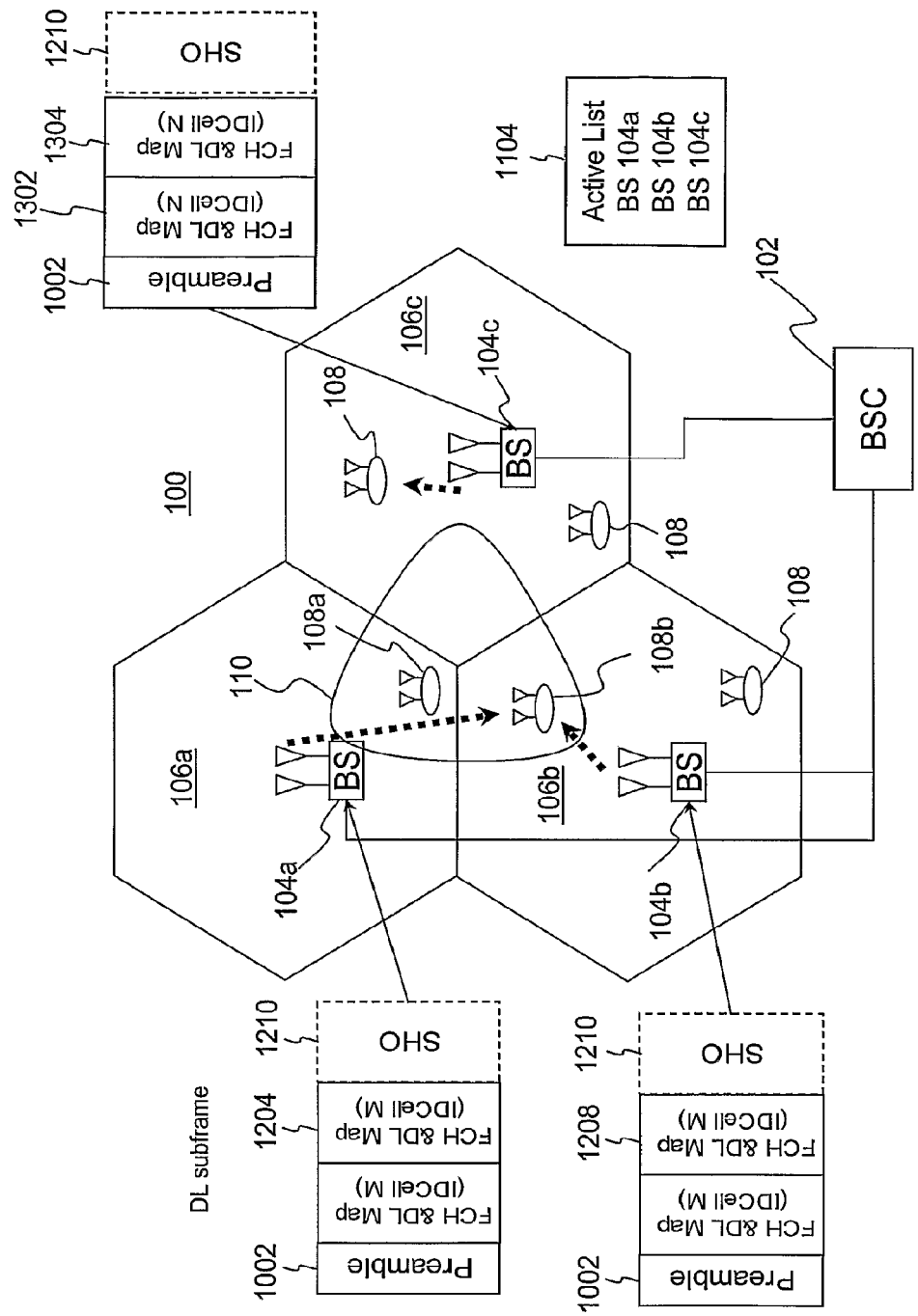
FIG. 13 is an example of interference avoidance in an OFDMA system in accordance with one embodiment of the present invention.

In an SHO Zone where a common IDcell is used, base stations in an active set transmit the same data in the data region defined in DL MAP. Referring to FIG. 13, base station 104c can simply turn off its transmission in this data region to achieve interference avoidance. Subscriber station uses the same procedure to decode data as in non-SHO mode, with signals from multiple base stations being energy combined or soft combined if the relative delays within active base stations are smaller than the prefix or a predefined value. Base stations with relative delays larger than prefix or a predefined value can turn off their transmission in this data region to achieve interference avoidance. Base stations preferably coordinate their schedulers such that different subscriber stations use different zones 1302, 1304.

In another embodiment of the present invention, the DL SHO based macro-diversity provides selection combining for PUSC/FUSC with different permutations or different CIDs in each cell.

Referring to FIG. 11, base stations in an active set transmit the same data. Subscriber station demodulates data from each base station, selects one successfully decoded data from, for example, base station 104c. In UL macro-diversity SHO, similar to the downlink case, for PUSC with same subchannel definition, for example, permutation in each cell, the soft handover zone is used. The subscriber station may transmit data to serving base station but other base stations in active set can also receive data, which makes the selection diversity possible. One advantage of this scheme is that it does not require additional complexity to subscriber station. Subscriber station transmits the data in the same way as in the non-SHO case. Also, selection diversity gain can be achieved.

For PUSC with different subchannel definition, for example, permutation in each cell, all base stations in active set assign uplink data region to subscriber station, and subscriber station sends the uplink data to all active base stations according to the allocation information of each base station.

Subscriber station preferably supports all the UL-MAP from the base stations in the active set. Another possible implementation involves a serving or anchor base station sending the UL-MAP with the allocation information of itself and other base stations in the active set. In this case, subscriber station only needs to see the UL-MAP from the anchor base station.

Table 2 provides a summary of SHO based macro-diversity transmission schemes.

TABLE 2

| Configurations | RF Combining PUSC/FUSC | Soft Combining PUSC/FUSC | Joint MIMO PUSC/FUSC | Interference Avoidance PUSC/FUSC | Selection combining PUSC/FUSC |
|---|---|---|---|---|---|
| Common Permutation | Yes | No | Yes | Yes | No |
| Common CID | Yes | Yes | Yes | Yes | No |
| DL | Yes | Yes | Yes | Yes | Yes |
| UL | No | No | No | No | Yes |
| Subscriber station Backward Compatible | Yes | No | No | Yes | No |
| Coverage benefit | LLR combining with same level interference | Interference level reduction only | LLR combining with interference level reduction | Interference level reduction only | Selective diversity with same level interference |

In MIMO system, base stations in an active set may preferably transmit the same data in the data region defined in DL_MAP in a SHO Zone where a common IDcell is used. The total N antennas of SHO-base stations constitute an antenna pool. The anchor base station selects certain numbers of antennas from the antenna pool, and decides MIMO transmission mode based on subscriber station capability and channel condition, for example. The antenna selection can be varied from subchannel to subchannel to maximize spatial diversity. A pre-determined antenna selection formula can be used. For FUSC, anchor base station may coordinate schedulers to avoid channel estimation interference. For a particular subchannel, the allocated antennas in the base stations in the active set may concurrently transmit the data for the same packet with the same CID and use the same data randomizer. The subscriber station receives the RF-combined MIMO signal from the same data region and demodulates it, and then decodes the packet based on the combined soft bits between the different data region.

The source data in the different antennas may also be different, in this case, the macro-diversity MIMO scheme intends to achieve higher cell throughput, or to decode the packet based on the combined soft bits between the different data regions.

In a MIMO system, after receiving transmitted data encoded in space-time (STC) code the subscriber stations provide corresponding STC decoding to recover the transmitted data. The STC coding may be either space-time-transmit diversity (STTD), space-frequency-transmit diversity (SFTD) or space multiplexing (SM) coding. STTD coding encodes data into multiple formats and simultaneously transmits the multiple foimats with spatial diversity (i.e. from antennas at different locations). SM coding separates data into different groups and separately encodes and simultaneously transmits each group. Other coding schemes will be recognized by those skilled in the art. The subscriber station will separately de-modulate and decode the received data from each base station, and then combine the decoded data from each base station to recover the original data.

There are three levels of macro-diversity MIMO operations which may be combined to improve both the overall handoff performance and the cell throughput.

In the case of macro-diversity MIMO with RF combining, the packet being delivered to SHO subscriber station is duplicated and all or some antennas in the antenna pool formed with SHO base stations transmit the data for the same packet in the same data region such as a subchannel.

In the case of macro-diversity MIMO with diversity combining, the data for the same packet is transmitted through another set of antennas in another data region with the same size, and these two can be soft-combined in order to achieve diversity combining.

In the case of macro-diversity MIMO with data rate enhancement, the data for the different packet is transmitted through another set of antennas in the same or another data region, and these two can be separately decoded in order to achieve data rate increase. Note that for this scheme, two data regions shall be different.

For a certain subscriber station, these three schemes may be implemented simultaneously. This macro-diversity MIMO enhancement operation may also be transparent to subscriber station, as each SHO subscriber station may not know which base stations are transmitting in order to decode the transmitted data.

A general expression for macro-diversity MIMO operation is show in FIG. 15 (a), wherein N is the total number of antennas in the antenna pool used for macro-diversity MIMO and K is the number of allocated frequency region for the subscriber station. The '0' in the matrix indicates 'no data transmission' and 'S' is 'data transmission'. S=[a or a' or b or b' . . . k or k'], N=(number of base stations)×(number of antennas per base station).

Macro-diversity MIMO with RF combining is described in FIG. 15 (b). In this example, after RF combining from three base stations, the received data is further STC decoded. Antenna 1 and antenna 2 form a pair of antennas from the antenna pool.

FIG. 15 (c) shows an example for macro-diversity MIMO with diversity combining and STC decoding.

FIG. 15 (d) is an example for macro-diversity MIMO with data rate enhancement combined with STC.

In DL SHO macro-diversity MIMO applications, several base stations may be selected by a subscriber station to perform collaborative transmissions. The collaborative transmission can be considered as interference avoidance, multicast and MIMO transmission with space multiplexing or space time coded transmission format.

As an example shown in Table 3, among 5 base stations, in the active set, each base station has various number of transmit antennas, for example, BS-1 has only two antennas while BS-2 has four antennas. For example, A(2,1) denotes Antenna-1 of base station 2. This base station configuration is used in the following examples.

TABLE 3

|  | BS-1 | BS-2 | BS-3 | BS-4 | BS-5 |
|---|---|---|---|---|---|
| Antenna-1 | A(1, 1) | A(2, 1) | A(3, 1) | A(4, 1) | A(5, 1) |
| Antenna-2 | A(1, 2) | A(2, 2) | — | A(4, 2) | A(5, 2) |
| Antenna-3 | — | A(2, 3) | — | A(4, 3) | — |
| Antenna-4 | — | A(2, 4) | — | — | — |

The antennas can be treated as antenna pool resource. Both open loop and closed loop solutions may be used for different space time coding formats.

Figure 14:
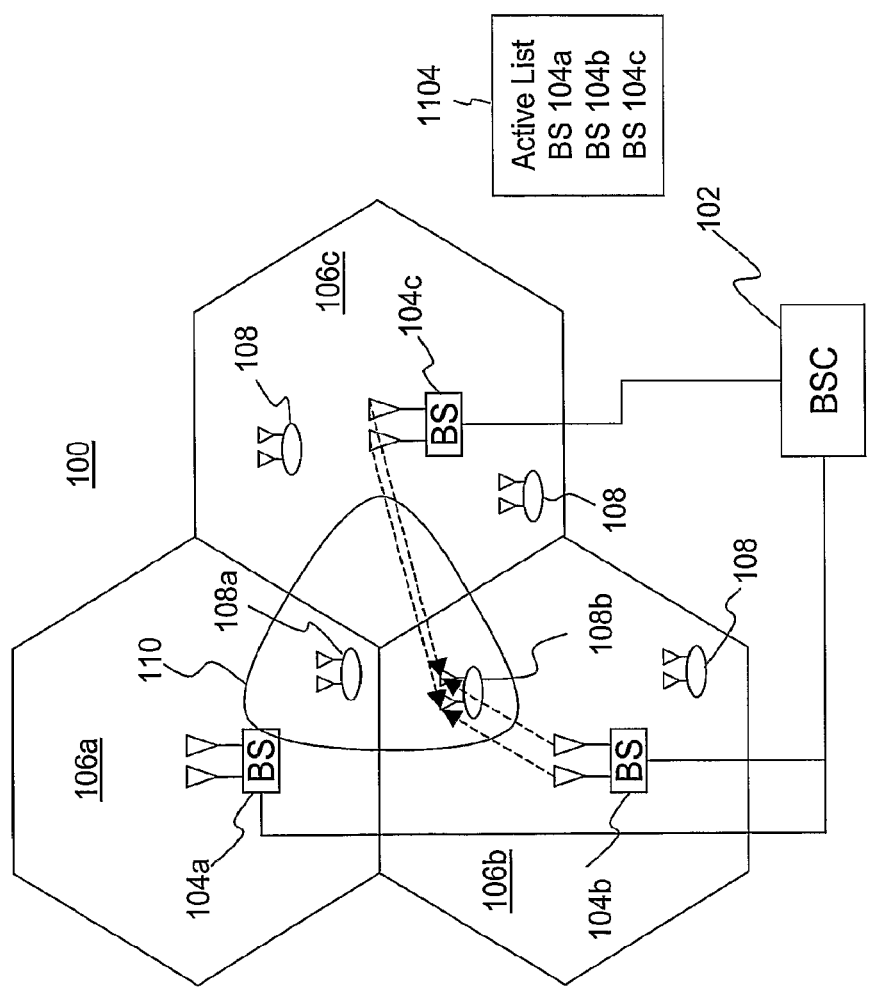
FIG. 14 shows is an example of a multi-input, multi-output OFDMA system in accordance with an aspect of the present invention.

In open loop transmission where no feedback channel is present, preferably involves coordination at network level to arrange the antenna transmission format. There may exist a deterministic antenna selection rule for open loop transmission. Referring to FIG. 14, a two-branch transmission between the subscriber station 108b and base stations 104b, 104c is illustrated.

The open loop macro-diversity transmission which may be space time transmit diversity (STTD) or spatial multiplexing (SM) is shown in Table 4, where synchronous packet streams are delivered to active set base station, in this case BS-1 and BS-2. As can be seen from Table 4, MIIVIO antenna #1 and MIMO antenna #2, are defined by alternating transmitting antennas from different base stations.

TABLE 4

| OFDM Symbol/ Subcarrier | BS-1 | MIMO Antenna # | BS-2 | MIMO Antenna # |
|---|---|---|---|---|
| 1 | A(1, 1) | 1 | A(2, 1) | 2 |
| 2 | A(1, 2) | 1 | A(2, 2) | 2 |
| 3 | A(1, 1) | 1 | A(2, 3) | 2 |
| 4 | A(1, 2) | 1 | A(2, 4) | 2 |

Figure 16A:
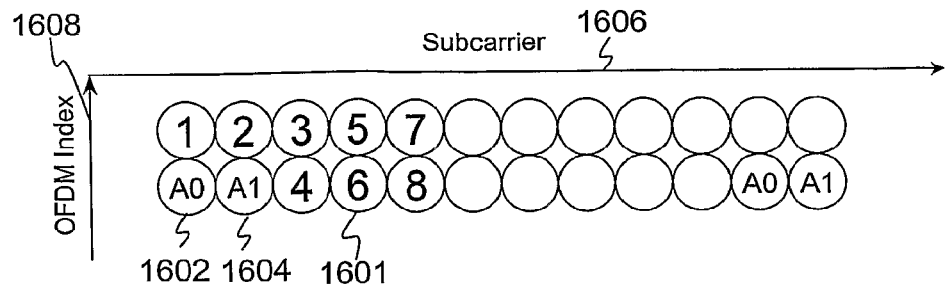

The transmit matrix definition for the MIMO antennas in Table 4 is defined in Table 5. FIG. 16a shows an exemplary mapping of subcarriers, the position of the subcarriers 1601 in relation to the antennas 1602, 1604 are illustrated in relation to the subcarrier index 1606 and OFDM index 1608.

TABLE 5

| OFDM | SM (2Rx) | | STTD (1Rx) | |
|---|---|---|---|---|
| Symbol/Subcarrier | 1 | 2 | 1 | 2 |
| MIMO Antenna #1 | $S_1$ | $S_3$ | $S_1$ | $S_2$ |
| MIMO Antenna #2 | $S_2$ | $S_4$ | $-S_2^*$ | $S_1^*$ |

The open loop macro-diversity transmission which may be space time transmit diversity (STTD) or spatial multiplexing (SM) is shown in Table 6, where asynchronous packet streams are delivered to active set base station, in this case BS-1 and BS-2. As can be seen from Table 5, MIMO antenna #1 to MIMO antenna #2, are defined by alternating transmitting antennas from different base stations.

TABLE 6

| OFDM Symbol/Subcarrier | BS-1 | MIMO Antenna # | BS-2 | MIMO Antenna # |
|---|---|---|---|---|
| 1 | A(1, 1) | 1 | A(2, 1) | 3 |
| 2 | A(1, 2) | 2 | A(2, 2) | 4 |
| 3 | A(1, 1) | 1 | A(2, 3) | 3 |
| 4 | A(1, 2) | 2 | A(2, 4) | 4 |

Figure 16B:
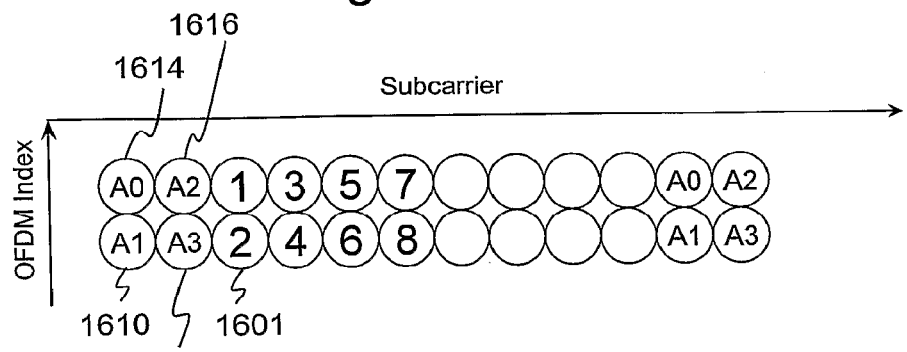

The matrix definition for the MIMO antennas in Table 6 is defined in Table 7, where a single receiving antenna is used for STTD decoding, and in Table 8, where four receiving antennas are used for SM, and two antennas for STTD. FIG. 16b shows an exemplary mapping of subcarriers, the position of the subcarriers 1601 in relation to the antennas 1610 to 1616 are illustrated in relation to the subcarrier index and OFDM index.

TABLE 7

| OFDM | STTD (1Rx) | | | |
|---|---|---|---|---|
| Symbol/Subcarrier | 1 | 2 | 3 | 4 |
| MIMO Antenna #1 | $S_1$ | $S_2$ | 0 | 0 |
| MIMO Antenna #2 | $-S_2^*$ | $S_1^*$ | 0 | 0 |
| MIMO Antenna #3 | 0 | 0 | $S_3$ | $S_4$ |
| MIMO Antenna #4 | 0 | 0 | $-S_4^*$ | $S_3^*$ |

TABEL 8

| OFDM | SM (4 Rx) | | STTD (2Rx) | |
|---|---|---|---|---|
| Symbol/Subcarrier | 1 | 2 | 1 | 2 |
| MIMO Antenna #1 | $S_1$ | $S_5$ | $S_1$ | $S_2$ |
| MIMO Antenna #2 | $S_2$ | $S_6$ | $-S_2^*$ | $S_1^*$ |
| MIMO Antenna #3 | $S_3$ | $S_7$ | $S_3$ | $S_4$ |
| MIMO Antenna #4 | $S_4$ | $S_8$ | $-S_4^*$ | $S_3^*$ |

The Open loop macro-diversity transmission with three antennas is shown in Table 9, where synchronous packet streams are delivered to active set base station, in this case BS-1, BS-2 and BS-3. As can be seen from Table 8, MIMO antenna #1, #2 and #3 are defined by the antennas from different base stations.

TABLE 9

| OFDM Symbol/ Subcarrier | BS-1 | MIMO Antenna # | BS-2 | MIMO Antenna # | BS-3 | MIMO Antenna # |
|---|---|---|---|---|---|---|
| 1 | A(1, 1) | 1 | A(2, 1) | 2 | A(3, 1) | 3 |
| 2 | A(1, 2) | 1 | A(2, 2) | 2 | A(3, 1) | 3 |
| 3 | A(1, 1) | 1 | A(2, 3) | 2 | A(3, 1) | 3 |
| 4 | A(1, 2) | 1 | A(2, 4) | 2 | A(3, 1) | 3 |

Figure 16C:
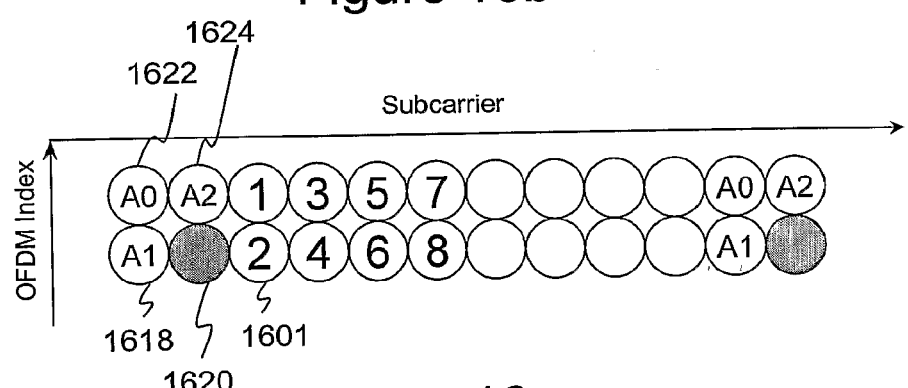

The matrix definition for the MIMO antennas in Table 9 is defined in Table 10, where three receiving antennas are used for SM, and two antennas for STTD. FIG. 16c shows an exemplary mapping of subcarriers, the position of the subcarriers 1601 in relation to the antennas 1618, 1622, and 1624 are illustrated in relation to the subcarrier index and OFDM index, in this example subcarrier 1620 is not used.

TABLE 10

| OFDM Symbol/ | SM (3Rx) | | | STTD (2Rx) | | | |
|---|---|---|---|---|---|---|---|
| Subcarrier | 1 | 2 | 3 | 1 | 2 | 3 | 4 |
| MIMO Antenna #1 | $S_1$ | $S_5$ | $S_9$ | $S_1$ | $S_2$ | 0 | 0 |
| MIMO Antenna #2 | $S_2$ | $S_6$ | $S_{10}$ | $-S_2^*$ | $S_1^*$ | $S_3$ | $S_4$ |
| MIMO Antenna #3 | $S_3$ | $S_7$ | $S_{11}$ | 0 | 0 | $-S_3^*$ | $S_4^*$ |

The open loop macro-diversity transmission with three antennas is shown in Table 11, where asynchronous packet streams are delivered to active set base station, in this case BS-1, BS-2 and BS-3. As can be seen from Table 8, MIMO antenna #1 to #6 are defined by the antennas from different base stations.

TABLE 11

| OFDM Symbol/ Subcarrier | BS-1 | MIMO Antenna # | BS-2 | MIMO Antenna # | BS-3 | MIMO Antenna # |
|---|---|---|---|---|---|---|
| 1 | A(1, 1) | 1 | A(2, 1) | 3 | A(3, 1) | 5 |
| 2 | A(1, 2) | 2 | A(2, 2) | 4 | A(3, 1) | 6 |
| 3 | A(1, 1) | 1 | A(2, 3) | 3 | A(3, 1) | 5 |
| 4 | A(1, 2) | 2 | A(2, 4) | 4 | A(3, 1) | 6 |

Figure 16D:
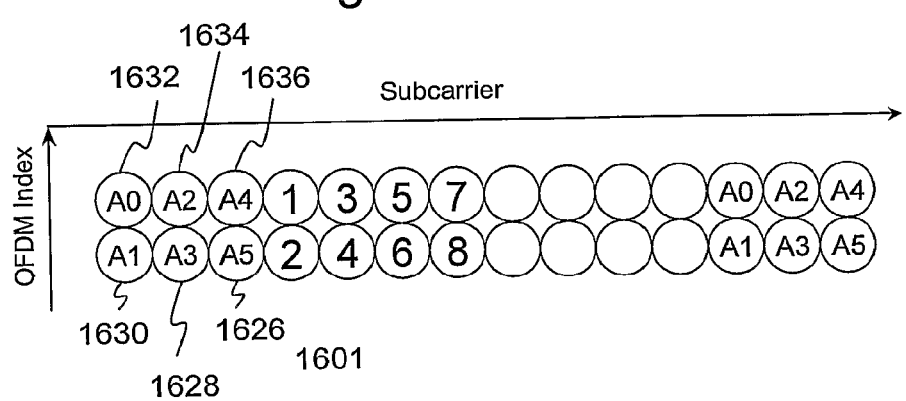

The matrix definition for the MIMO antennas in Table 11 is defined in Table 12, where three receiving antennas are used for SM, and single antenna for STTD. FIG. 16d shows an exemplary mapping of subcarriers, the position of the subcarriers 1601 in relation to the antennas 1626 to 1636 are illustrated in relation to the subcarrier index and OFDM index.

TABLE 12

| OFDM Symbol/ | SM (3Rx) | | STTD (1Rx) | | | | | |
|---|---|---|---|---|---|---|---|---|
| Subcarrier | 1 | 2 | 1 | 2 | 3 | 4 | 5 | 6 |
| MIMO Antenna, #1 | $S_1$ | $S_7$ | $S_1$ | $S_2$ | 0 | 0 | 0 | 0 |
| MIMO Antenna #2 | $S_2$ | $S_8$ | $-S_2^*$ | $S_1^*$ | 0 | 0 | 0 | 0 |
| MIMO Antenna #3 | $S_3$ | $S_9$ | 0 | 0 | $S_3$ | $S_4$ | 0 | 0 |
| MIMO Antenna #4 | $S_4$ | $S_{10}$ | 0 | 0 | $-S_4^*$ | $S_3^*$ | 0 | 0 |
| MIMO Antenna #5 | $S_5$ | $S_{11}$ | 0 | 0 | 0 | 0 | $S_5$ | $S_6$ |
| MIMO Antenna #6 | $S_6$ | $S_{12}$ | 0 | 0 | 0 | 0 | $-S_6^*$ | $S_5^*$ |

Table 13 is an example of UL control channel for closed loop macro-diversity transmission with dynamic antenna selection. The closed loop transmission applies a sub-MIMO selection technique to chose best antenna configuration by intra-base station antenna switching in substantially the same manner as described above. However, a control channel for antenna selection is preferably provided.

TABLE 13

| | Vector Indexes per Tile | | | | | |
|---|---|---|---|---|---|---|
| Codeword # | Tile (0) | Tile (1) | Tile (2) | Tile (3) | Tile (4) | Tile (5) |
| 0 | 0 | 0 | 0 | 0 | 0 | 0 |
| 1 | 1 | 1 | 1 | 1 | 1 | 1 |
| 2 | 2 | 2 | 2 | 2 | 2 | 2 |
| 3 | 3 | 3 | 3 | 3 | 3 | 3 |
| 4 | 4 | 4 | 4 | 4 | 4 | 4 |
| 5 | 5 | 5 | 5 | 5 | 5 | 5 |
| 6 | 6 | 6 | 6 | 6 | 6 | 6 |
| 7 | 7 | 7 | 7 | 7 | 7 | 7 |

In this example, each subscriber station may have 8 code words for the antenna selection configuration of 3-bit.

Several illustrative combinations of 2-, 3- and 4-branch SHO joint MIMO configurations are summarized in Table 14.

TABLE 14

| | 2-BS | | 3-BS | | 4-BS | |
|---|---|---|---|---|---|---|
| MSS-Rx-1 | [BS1-1; BS2-1] 2×1-STTD (Synch) | [BS1-2; BS2-2] 4×1-STTD (Synch) | [BS1-1; BS2-1] 3×1-STTD (Synch) | [BS1-2; BS2-2] 4×1-STTD (Synch) | [BS1-1; BS2-1] 4×1-STTD (Synch) | [BS1-2; BS2-2] 4×1-STTD (Synch) |
| MSS-Rx-2 | [BS1-1; BS2-1] 2×2-SM (Asynch) | [BS1-2; BS2-2] 4×2-STTD (Synch) | [BS1-1; BS2-1] 3×2-STTD (Synch) | [BS1-2; BS2-2] 4×2-STTD (Synch) | [BS1-1; BS2-1] 4×2-STTD (Synch) | [BS1-2; BS2-2] 4×2-STTD (Synch) |
| MSS-Rx-4 | [BS1-1; BS2-1] 2×4-SM (Asynch) | [BS1-2; BS2-2] 4×4-SM (Asynch) | [BS1-1; BS2-1] 3×4-SM (Asynch) | [BS1-2; BS2-2] 4×4-SM (Asynch) | [BS1-1; BS2-1] 4×4-SM (Asynch) | [BS1-2; BS2-2] 4×4-SM (Asynch) |

What is claimed is:

1. A method for facilitating soft handoffs in an orthogonal frequency division multiplexing access (OFDMA) system comprising the steps of:
  a) dividing subcarriers in a plurality of orthogonal frequency division multiplexing (OFDM) symbols;
  b) allocating said divided subcarriers into subchannels;
  c) dividing and multiplexing said plurality of OFDM symbols;
  d) defining a soft handoff zone comprising a first dimension of said subchannels and a second dimension of said divided and multiplexed plurality of OFDM symbols, said soft handoff zone having a first plurality of subcarriers, said first plurality of subcarriers having a subchannel definition; and
  e) transmitting said first plurality of subcarriers in said soft handoff zone to a station.

2. The method according to claim 1, wherein said subchannel definition is identical for each of said first plurality of subcarriers.

3. The method according to claim 1, wherein said subchannel definition is a subcarrier permutation.

4. The method according to claim 3, wherein said subcarrier permutation is distributed.

5. The method according to claim 3, wherein said subcarrier permutation is adjacent.

6. The method according to claim 1, wherein the steps of dividing subcarriers in a plurality of OFDM symbols and allocating said divided subcarriers into subchannels are performed in a frequency domain.

7. The method according to claim 1, wherein said station is a subscriber station in a soft handoff area, and said first plurality of subcarriers in said soft handoff zone are transmitted in a downlink from a base station to said subscriber station.

8. The method according to claim 7, wherein said base station is a first base station, further comprising the step of transmitting a second plurality of subcarriers in said soft handoff zone from one or more than one second base stations to said subscriber station concurrently, said first base station and said one or more than one second base stations forming a macro-diversity transmission.

9. The method according to claim 8, further comprising the step of combining radio frequency (RF) signals from said macro-diversity transmission from said first base station and said one or more than one second base stations.

10. The method according to claim 8, wherein said first plurality of subcarriers transmitted between said first base station and said subscriber station is different from said second plurality of subcarriers transmitted between said one or more than one second base stations and said subscriber station, thus achieving higher throughput.

11. The method according to claim 7, wherein all subchannels are allocated to a transmitter.

12. The method according to claim 7, wherein some subchannels are allocated to a transmitter.

13. The method according to claim 8, further comprising the step of demodulating signals from said macro-diversity transmission from said first base station and said one or more than one second base stations separately, and combining received data at Log Likelihood Ratio (LLR) level.

14. The method according to claim 8, further comprising the step of turning off one of said base stations for providing interference avoidance.

15. The method according to claim 14, further comprising the step of turning off one of said base stations based on a pre-determined assignment on said plurality of subcarriers.

16. The method according to claim 14, further comprising the step of turning off one of said base stations in an active set list on said plurality of subcarriers.

17. The method according to claim 8, further comprising the step of combining the macro-diversity transmission from said first base station and said one or more than one second base stations, said macro-diversity transmission having different subcarrier permutation and different connection identifier (CID).

18. The method according to claim 8, further comprising the step of combining the macro-diversity transmission from said first base station and said one or more than one second base stations, said macro-diversity transmission having different subcarrier permutation and same connection identifier (CID).

19. The method according to claim 8, wherein said macro-diversity transmission is a multi-input multi-output (MIMO) transmission, wherein said first base station and said one or more than one second base stations provide a plurality of antennas to form an antenna pool, further comprising a step of selecting transmitting antennas from said antenna pool.

20. The method according to claim 19, wherein said MIMO transmission is based on space-frequency coding (SFC).

21. The method according to claim 19, wherein said MIMO transmission is based on space multiplexing coding (SM).

22. The method according to claim 19, wherein said first plurality of subcarriers and said second plurality of subcarriers are identical, and all or some antennas in said antenna pool transmit said OFDM symbols in a same data region, further comprising the step of combining radio frequency (RF) signals from said first base station and said one or more than one second base stations.

23. The method according to claim 19, wherein said first plurality of subcarriers is transmitted through a first set of antennas in a first data region, and said second plurality of subcarriers is transmitted through a second set of antennas in a second data region of a same size, further comprising the step of soft-combining said first plurality of subcarriers and said second plurality of subcarriers to achieve diversity combining and soft combining gain.

24. The method according to claim 19, wherein said first plurality of subcarriers is transmitted through a first set of antennas in a first data region, and said second plurality of subcarriers is transmitted through a second set of antennas in a second data region, further comprising the step of separately decoding said first plurality of subcarriers and said second plurality of subcarriers to achieve data rate increase.

25. The method according to claim 19, wherein said first plurality of subcarriers transmitted through a first set of antennas can be synchronous to said second plurality of subcarriers transmitted through a second set of antennas.

26. The method according to claim 19, wherein said first plurality of subcarriers transmitted through a first set of antennas can be asynchronous to said second plurality of subcarriers transmitted through a second set of antennas.

27. The method according to claim 19, wherein said MIMO transmission is based on space-time coding (STC).

28. The method according to claim 27, wherein said STC is space-time-transmit diversity (STTD).

29. The method according to claim 27, wherein said STC is space-frequency-transmit diversity (SFTD).

30. The method according to claim 1, wherein said station is a subscriber station in a soft handoff area, and said first plurality of subcarriers in said soft handoff zone are transmitted in a downlink from a base station on an active set list to said subscriber station.

31. The method according to claim 1, wherein said station is a base station, and said first plurality of subcarriers in said soft handoff zone is transmitted in an uplink from a subscriber station to said base station.

32. The method according to claim 1, wherein said station is a base station on an active set list, and said first plurality of subcarriers in said soft handoff zone is transmitted in an uplink from a subscriber station to said base station.

33. The method according to claim 1, wherein said dividing and multiplexing step is time division multiplexing.

34. The method according to claim 1, wherein said dividing and multiplexing step is frequency division multiplexing.

35. The method according to claim 1, wherein said dividing and multiplexing step uses space-time code (STC).

36. The method according to claim 1, wherein said dividing and multiplexing step is spatial multiplexing.

37. The method according to claim 1, further comprising the step of allocating pilot subcarriers into subchannels first, and allocating data carriers into remaining subchannels.

38. The method according to claim 1, further comprising the step of allocating used subcarriers into subchannels first, and allocating pilot subcarriers into said subchannels.

* * * * *